US012628863B2

(12) United States Patent
Wagner et al.

(10) Patent No.: US 12,628,863 B2
(45) Date of Patent: May 19, 2026

(54) METHOD FOR MANUFACTURING AEROSOL GENERATING ARTICLES

(71) Applicant: JT International SA, Geneva (CH)

(72) Inventors: Marcus Wagner, Hamburg (DE); Julia Schwanebeck, Geesthacht (DE); Marlo-Leander Schmidt, Hamburg (DE); Felix Seitz, Hamburg (DE); Martina Stamer, Grosshansdorf (DE)

(73) Assignee: JT International SA, Geneva (CH)

( * ) Notice: Subject to any disclaimer, the term of this patent is extended or adjusted under 35 U.S.C. 154(b) by 256 days.

(21) Appl. No.: 18/025,065

(22) PCT Filed: Sep. 17, 2021

(86) PCT No.: PCT/EP2021/075590
§ 371 (c)(1),
(2) Date: Mar. 7, 2023

(87) PCT Pub. No.: WO2022/058480
PCT Pub. Date: Mar. 24, 2022

(65) Prior Publication Data
US 2023/0329320 A1 Oct. 19, 2023

(30) Foreign Application Priority Data
Sep. 21, 2020 (EP) .................................... 20197138

(51) Int. Cl.
*A24C 5/01* (2020.01)
*A24C 5/18* (2006.01)
(Continued)

(52) U.S. Cl.
CPC .............. *A24C 5/01* (2020.01); *A24C 5/1892* (2013.01); *A24C 5/28* (2013.01); *H05B 3/22* (2013.01);
(Continued)

(58) Field of Classification Search
CPC .......... A24F 40/465; A24F 40/20; A24D 1/20
See application file for complete search history.

(56) References Cited

U.S. PATENT DOCUMENTS

2004/0123710 A1 7/2004 Rizzoli et al.
2007/0204869 A1 9/2007 Sampson et al.
(Continued)

FOREIGN PATENT DOCUMENTS

CN 110545680 A 12/2019
CN 111565584 A 8/2020
(Continued)

OTHER PUBLICATIONS

Schmick WO 2020127545 A1 English Machine Translation (Year: 2020).*
(Continued)

*Primary Examiner* — Michael H. Wilson
*Assistant Examiner* — Daniel Edward Vakili
(74) *Attorney, Agent, or Firm* — Lerner David LLP

(57) ABSTRACT

A method for continuously manufacturing aerosol generating articles includes: (i) providing a continuous web or a continuous strip of an aerosol generating substrate; (ii) providing a continuous web of susceptor material; (iii) continuously cutting the continuous web of susceptor material to form a plurality of susceptor patches; (iv) consecutively applying the patches to a surface of the continuous web or continuous strip of aerosol generating substrate with a predefined and constant spacing between each successive patch; and forming the web or strip of aerosol generating substrate and the patches into a continuous rod. Step (iii) uses a rotary cutting unit including a support drum supporting the continuous web of susceptor material around its periphery and a cutting drum having a plurality of circumferentially spaced cutting elements around its periphery. The
(Continued)

cutting elements cooperate with the support drum to shear cut the continuous web of susceptor material to form the patches.

18 Claims, 14 Drawing Sheets

(51) Int. Cl.

| | |
|---|---|
| ***A24C 5/28*** | (2006.01) |
| ***A24D 1/20*** | (2020.01) |
| ***A24F 40/20*** | (2020.01) |
| ***A24F 40/465*** | (2020.01) |
| ***H05B 3/22*** | (2006.01) |

(52) U.S. Cl.
CPC ................ *A24D 1/20* (2020.01); *A24F 40/20* (2020.01); *A24F 40/465* (2020.01)

(56) References Cited

U.S. PATENT DOCUMENTS

| | | | | |
|---|---|---|---|---|
| 2017/0079320 | A1 | 3/2017 | Le Roux | |
| 2018/0352851 | A1* | 12/2018 | Prestia | A24D 1/002 |
| 2020/0107571 | A1 | 4/2020 | Sanna et al. | |
| 2020/0107573 | A1 | 4/2020 | Sanna et al. | |
| 2020/0114097 | A1* | 4/2020 | Sanna | A24D 1/20 |
| 2020/0323271 | A1 | 10/2020 | Alizon et al. | |

FOREIGN PATENT DOCUMENTS

| | | | | |
|---|---|---|---|---|
| DE | 102018132628 A1 | | 6/2020 | |
| GB | 1589920 | * | 5/1981 | |
| JP | 2004135671 A | | 5/2004 | |
| JP | 2007524418 A | | 8/2007 | |
| JP | 2017518746 A | | 7/2017 | |
| JP | 2018515113 A | | 6/2018 | |
| JP | 2020505906 A | | 2/2020 | |
| WO | WO-2009112257 A1 | * | 9/2009 | B65H 39/14 |
| WO | 2016184929 A1 | | 11/2016 | |
| WO | 2019224075 A1 | | 11/2019 | |
| WO | WO-2020127545 A1 | * | 6/2020 | |

OTHER PUBLICATIONS

International Search Report for Application No. PCT/EP2021/075590 mailed Dec. 20, 2021, pp. 1-4.
Search Report dated Mar. 18, 2025 from the Office Action for Chinese Application No. 202180064179.5 issued Mar. 19, 2025. 2 pages.

* cited by examiner

METHOD FOR MANUFACTURING AEROSOL GENERATING ARTICLES

CROSS-REFERENCE TO RELATED APPLICATIONS

The present application is a national phase entry under 35 U.S.C. § 371 of International Application No. PCT/EP2021/075590, filed Sep. 17, 2021, published in English, which claims priority to European Application No. 20197138.9 filed Sep. 21, 2020, the disclosures of which are incorporated herein by reference.

TECHNICAL FIELD

The present disclosure relates generally to aerosol generating articles, and more particularly to an aerosol generating article for use with an aerosol generating device for heating the aerosol generating article to generate an aerosol for inhalation by a user. Embodiments of the present disclosure relate in particular to a method for continuously manufacturing aerosol generating articles. The present disclosure is particularly applicable to the manufacture of aerosol generating articles for use with a portable (hand-held) aerosol generating device.

TECHNICAL BACKGROUND

The popularity and use of reduced-risk or modified-risk devices (also known as aerosol generating devices or vapour generating devices) has grown rapidly in recent years as an alternative to the use of traditional tobacco products. Various devices and systems are available that heat or warm aerosol generating substances to generate an aerosol for inhalation by a user.

A commonly available reduced-risk or modified-risk device is the heated substrate aerosol generating device, or so-called heat-not-burn device. Devices of this type generate an aerosol or vapour by heating an aerosol generating substrate to a temperature typically in the range 150° C. to 300° C. Heating the aerosol generating substrate to a temperature within this range, without burning or combusting the aerosol generating substrate, generates a vapour which typically cools and condenses to form an aerosol for inhalation by a user of the device.

Currently available aerosol generating devices can use one of a number of different approaches to provide heat to the aerosol generating substrate. One such approach is to provide an aerosol generating device which employs an induction heating system. In such a device, an induction coil is provided in the device and an inductively heatable susceptor is provided to heat the aerosol generating substrate. Electrical energy is supplied to the induction coil when a user activates the device which in turn generates an alternating electromagnetic field. The susceptor couples with the electromagnetic field and generates heat which is transferred, for example by conduction, to the aerosol generating substrate and an aerosol is generated as the aerosol generating substrate is heated.

It can be convenient to provide both the aerosol generating substrate and the inductively heatable susceptor together, in the form of an aerosol generating article which can be inserted by a user into an aerosol generating device. As such, there is a need to provide a method which facilitates the manufacture of aerosol generating articles, and in particular which enables aerosol generating articles to be mass-produced easily and consistently.

SUMMARY OF THE DISCLOSURE

According to a first aspect of the present disclosure, there is provided a method for continuously manufacturing aerosol generating articles, the method comprising:

(i) providing a continuous web or a continuous strip of an aerosol generating substrate;

(ii) providing a continuous web of susceptor material;

(iii) continuously cutting the continuous web of susceptor material to form a plurality of susceptor patches;

(iv) consecutively applying the plurality of susceptor patches to a surface of the continuous web or the continuous strip of aerosol generating substrate with a predefined and constant spacing between each successive susceptor patch; and (v) forming the continuous web or the continuous strip of aerosol generating substrate and the susceptor patches into a continuous rod;

wherein step (iii) is performed using a rotary cutting unit comprising a support drum supporting the continuous web of susceptor material around its periphery and a cutting drum having a plurality of circumferentially spaced cutting elements around its periphery, wherein the cutting elements cooperate with the support drum to shear cut the continuous web of susceptor material to form the plurality of susceptor patches.

Aerosol generating articles produced by the method are for use with an aerosol generating device for heating the aerosol generating substrate, without burning the aerosol generating substrate, to volatise at least one component of the aerosol generating substrate and thereby generate a heated vapour which cools and condenses to form an aerosol for inhalation by a user of the aerosol generating device. The aerosol generating device is a hand-held, portable, device.

In general terms, a vapour is a substance in the gas phase at a temperature lower than its critical temperature, which means that the vapour can be condensed to a liquid by increasing its pressure without reducing the temperature, whereas an aerosol is a suspension of fine solid particles or liquid droplets, in air or another gas. It should, however, be noted that the terms 'aerosol' and 'vapour' may be used interchangeably in this specification, particularly with regard to the form of the inhalable medium that is generated for inhalation by a user.

The method according to the present disclosure facilitates the manufacture of aerosol generating articles and in particular enables aerosol generating articles to be mass produced consistently and with relative ease.

The predefined and constant 'spacing' between each successive susceptor patch is the shortest distance between successive (i.e., adjacent) susceptor patches, i.e., the distance or gap between the edges of successive (i.e., adjacent) susceptor patches.

The continuous rod formed by step (v) is oriented in a direction of travel of the continuous web or the continuous strip of aerosol generating substrate. The continuous rod has a longitudinal axis. Thus, the longitudinal axis of the continuous rod is oriented in the direction of travel of the continuous web or the continuous strip of aerosol generating substrate. Continuous and mass production of aerosol generating articles is, thereby, readily achieved.

Steps (i) and (ii) may be performed sequentially, in any order, or may be performed simultaneously.

Step (iii) may comprise uniformly cutting the continuous web of susceptor material at a predefined and constant spacing. By doing so, the susceptor patches have substantially the same length in the direction of travel of the continuous web of susceptor material. Thus, aerosol generating articles manufactured by the method have consistent and repeatable characteristics.

The support drum may include a plurality of circumferentially spaced recesses around its periphery. The cutting elements on the cutting drum may cooperate with the circumferentially spaced recesses during rotation of both the support drum and the cutting drum to shear cut the continuous web of susceptor material to form the plurality of susceptor patches.

The support drum may be a suction drum. The continuous web of susceptor material and one or more of the susceptor patches may be supported around the periphery of the suction drum, for example by a suction force. The continuous web of susceptor material and the susceptor patches are reliably supported and transported in the desired direction of travel by the suction drum, by a suction or vacuum effect.

The predefined and constant spacing between each successive susceptor patch may be obtained by permitting relative movement between the continuous web of susceptor material and the support drum, for example for a predetermined period of time after cutting the continuous web of susceptor material to form a susceptor patch. In this way, the continuous web of susceptor material remains stationary, or travels at a reduced speed, for a short period of time after a susceptor patch has been cut from the continuous web of susceptor material. At the same time, there is no relative movement between the susceptor patch and the support drum, and thus the susceptor patch is conveyed by the support drum at a greater speed than the continuous web of susceptor material. This creates in a convenient manner a predefined spacing between the susceptor patch and the continuous web of susceptor material so that when the continuous web of susceptor material is cut to form a subsequent susceptor patch, the aforesaid predetermined and constant spacing is formed between successive susceptor patches. It will be understood that the predetermined period of time for which the relative movement between the continuous web of susceptor material and the support drum is permitted, in combination with the speed of rotation of the support drum, determines the spacing between each successive susceptor patch.

The relative movement between the continuous web of susceptor material and the support drum, e.g., suction drum, may be obtained by reducing the suction force applied to the web of susceptor material. The relative movement between the continuous web of susceptor material and the suction drum can therefore be readily achieved and reliably controlled.

Each of the plurality of susceptor patches may have substantially the same dimensions. Aerosol generating articles manufactured by the method thus have consistent and repeatable characteristics.

Each susceptor patch may have a length between 5 mm and 50 mm, preferably between 10 mm and 30 mm. In one embodiment, each susceptor patch may have a width between 0.1 mm and 5 mm, preferably between 0.5 mm and 2 mm. In another embodiment, each susceptor patch may have a width between 0.1 mm and 7 mm, preferably between 1 mm and 5 mm. Each susceptor patch may have a thickness between 1 μm and 500 μm, preferably between 10 μm and 100 μm. Susceptor patches with these dimensions are particularly suitable for the manufacture of aerosol generating articles.

The predefined and constant spacing between each successive susceptor patch may be between 1 mm and 20 mm, preferably between 2 mm and 10 mm.

Step (iv) may comprise adhering the susceptor patches to the surface of the continuous web or the continuous strip of aerosol generating substrate. By adhering the susceptor patches to the surface of the continuous web or the continuous strip of aerosol generating substrate, the predetermined and constant spacing between each successive susceptor patch can be maintained, thus ensuring that aerosol generating articles manufactured by the method according to the present disclosure have consistent and repeatable characteristics.

Step (iv) may comprise pressing the susceptor patches onto the surface of the continuous web or the continuous strip of aerosol generating substrate. The pressing step may be performed using a cam roller. By pressing the susceptor patches onto the surface of the continuous web or the continuous strip of aerosol generating substrate, the predetermined and constant spacing between each successive susceptor patch can be maintained, thus ensuring that aerosol generating articles manufactured by the method according to the present disclosure have consistent and repeatable characteristics. The use of a cam roller may be advantageous as it allows a pressing force to be easily applied at spaced positions along the continuous web or the continuous strip of aerosol generating substrate which correspond to the positions of the applied susceptor patches.

The continuous web or the continuous strip of aerosol generating substrate provided in step (i) may include a substantially flat surface which may have a centre line. Step (iv) may comprise consecutively applying the plurality of susceptor patches to the substantially flat surface substantially along the centre line. Accurate and consistent positioning of the susceptor patches along the centre line ensures that aerosol generating articles manufactured by the method according to the present disclosure have consistent and repeatable characteristics.

The method may further comprise (vi) cutting the continuous rod to form a plurality of individual aerosol generating articles each comprising at least one susceptor patch. Continuous and mass production of aerosol generating articles is, thereby, readily achieved.

Step (vi) may comprise cutting the continuous rod at a position between adjacent susceptor patches. Cutting the continuous rod in this way ensures that the individual aerosol generating articles formed by cutting the continuous rod each comprise a susceptor patch and, thus, that the aerosol generating articles are consistent and repeatable. Also, because the susceptor patches are not cut during step (vi), wear during the cutting step (e.g., on a cutting unit) is minimised.

Step (vi) may comprise cutting the continuous rod substantially at a midpoint between adjacent susceptor patches. In this way, the susceptor patch is spaced inwardly from both ends of the resultant aerosol generating article and is not visible at either end of the aerosol generating article. This may improve the user acceptance of aerosol generating articles manufactured by the method according to the present disclosure. Furthermore, the susceptor is fully embedded in the aerosol generating substrate of the resultant aerosol generating article, and this may allow an aerosol or vapour to be generated more effectively because the whole of the susceptor is surrounded by the aerosol generating substrate and, therefore, heat transfer from the susceptor to the aerosol generating substrate is maximised.

Each susceptor patch may comprise an inductively heatable susceptor material, such as one or more, but not limited, of aluminium, iron, nickel, stainless steel, carbon steel, and alloys thereof, e.g. Nickel Chromium or Nickel Copper. With the application of an electromagnetic field in its vicinity during use of the aerosol generating article in an aerosol generating device, the susceptor material may generate heat due to eddy currents and magnetic hysteresis losses resulting in a conversion of energy from electromagnetic to heat.

The aerosol generating substrate may be any type of solid or semi-solid material. Example types of aerosol generating solids include powder, granules, pellets, shreds, strands, particles, gel, strips, loose leaves, cut leaves, cut filler, porous material, foam material or sheets. The aerosol generating substrate may comprise plant derived material and in particular, may comprise tobacco. It may advantageously comprise reconstituted tobacco, for example including tobacco and any one or more of cellulose fibres, tobacco stalk fibres and inorganic fillers such as $CaCO_3$.

Consequently, the aerosol generating device with which the aerosol generating articles are intended for use may be referred to as a "heated tobacco device", a "heat-not-burn tobacco device", a "device for vaporising tobacco products", and the like, with this being interpreted as a device suitable for achieving these effects. The features disclosed herein are equally applicable to devices which are designed to vaporise any aerosol generating substrate.

The continuous rod may be circumscribed by a paper wrapper. Thus, the method may further comprise wrapping the continuous rod with a paper wrapper.

The aerosol generating article may be formed substantially in the shape of a stick, and may broadly resemble a cigarette, having a tubular region with an aerosol generating substrate arranged in a suitable manner. The aerosol generating article may include a filter segment, for example comprising cellulose acetate fibres, at a proximal end of the aerosol generating article. The filter segment may constitute a mouthpiece filter and may be in coaxial alignment with an aerosol generating substrate, e.g., constituted by a plurality of aerosol generating strips. One or more vapour collection regions, cooling regions, and other structures may also be included in some designs. For example, the aerosol generating article may include at least one tubular segment upstream of the filter segment. The tubular segment may act as a vapour cooling region. The vapour cooling region may advantageously allow the heated vapour generated by heating the aerosol generating substrate to cool and condense to form an aerosol with suitable characteristics for inhalation by a user, for example through the filter segment.

The aerosol generating substrate may comprise an aerosol-former. Examples of aerosol-formers include polyhydric alcohols and mixtures thereof such as glycerine or propylene glycol. Typically, the aerosol generating substrate may comprise an aerosol-former content of between approximately 5% and approximately 50% on a dry weight basis. In some embodiments, the aerosol generating substrate may comprise an aerosol-former content of between approximately 10% and approximately 20% on a dry weight basis, and possibly approximately 15% on a dry weight basis.

Upon heating, the aerosol generating substrate may release volatile compounds. The volatile compounds may include nicotine or flavour compounds such as tobacco flavouring.

DETAILED DESCRIPTION OF EMBODIMENTS

Embodiments of the present disclosure will now be described by way of example only and with reference to the accompanying drawings.

Aerosol Generating Article (Example 1)

Figure 1A:
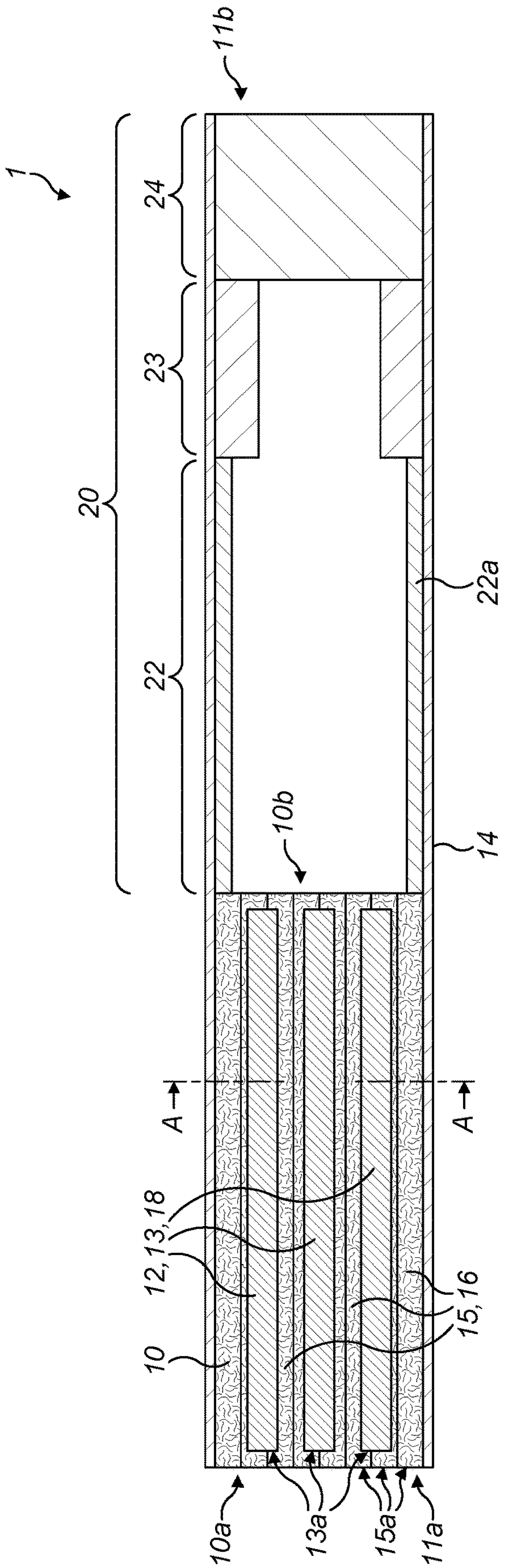
FIG. 1*a* is a diagrammatic cross-sectional side view of a first example of an aerosol generating article.
Figure 1B:
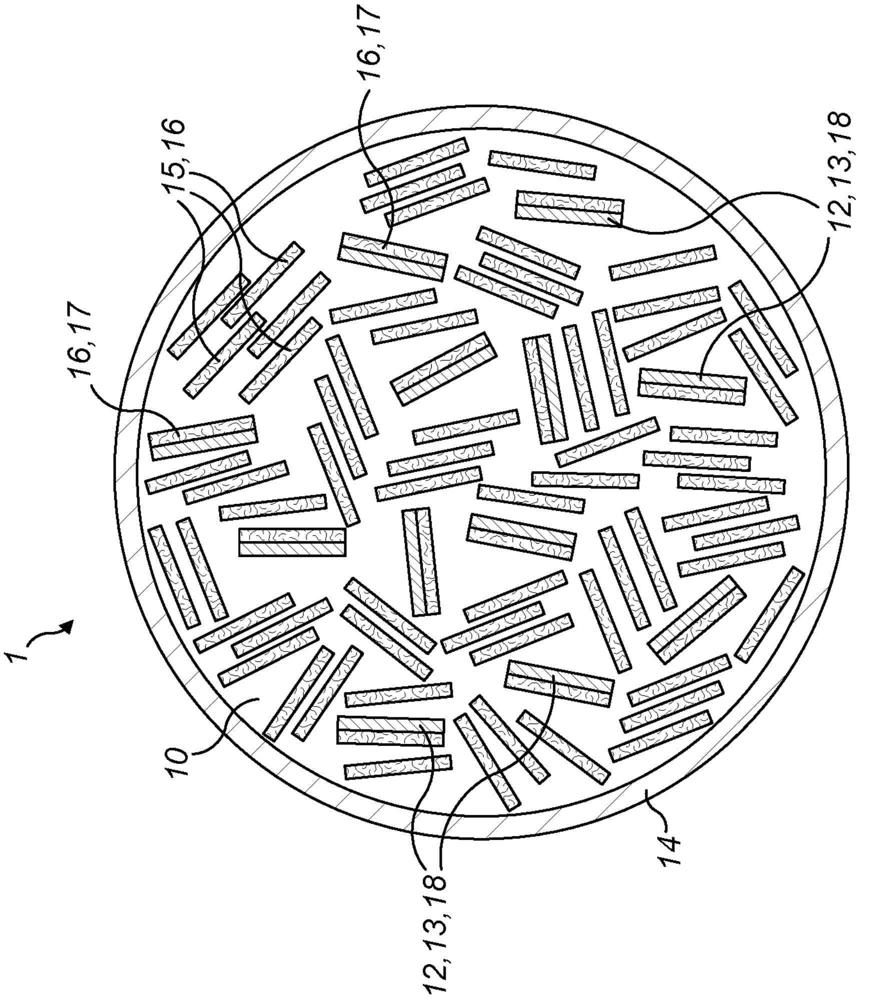
FIG. 1*b* is a diagrammatic cross-sectional view along the line A-A in FIG. 1*a;*

Referring initially to FIGS. 1*a* and 1*b*, there is shown a first example of an aerosol generating article 1 for use with an aerosol generating device that comprises an induction heating system to inductively heat the aerosol generating article 1 and thereby generate an aerosol for inhalation by a user of the device. Such devices are known in the art and will not be described in further detail in this specification. The aerosol generating article 1 is elongate, having a distal end 11*a* and a proximal end (or mouth end) 11*b*, and is substantially cylindrical. The circular cross-section facilitates handling of the article 1 by a user and insertion of the article 1 into a cavity or heating compartment of an aerosol generating device.

The aerosol generating article 1 comprises an aerosol generating substrate 10 having first and second ends 10*a*, 10*b* and an inductively heatable susceptor 12. The aerosol generating substrate 10 and the inductively heatable susceptor 12 are positioned in, and enclosed by, a wrapper 14. The wrapper 14 comprises a material which is substantially non-electrically conductive and non-magnetically permeable. In the illustrated example, the wrapper 14 is a paper wrapper and may comprise cigarette paper.

The aerosol generating article 1 may have a total length, measured between the distal end 11*a* and the proximal (mouth) end 11*b*, between 30 mm and 100 mm, preferably between 50 mm and 70 mm, possibly approximately 55 mm. The aerosol generating substrate 10 may have a total length, measured between the first and second ends 10*a*, 10*b*, between 5 mm and 50 mm, preferably between 10 mm and 30 mm, possibly approximately 20 mm. The aerosol generating article 1 may have a diameter between 5 mm and 10 mm, preferably between 6 mm and 8 mm, possibly approximately 7 mm.

The aerosol generating substrate 10 comprises a plurality of elongate first strips 15 comprising an aerosol generating material. The plurality of elongate first strips 15 constitute aerosol generating strips 16 and are substantially oriented in a longitudinal direction of the aerosol generating article 1. The elongate first strips 15 are typically foldless in the longitudinal direction to ensure that the air flow route is not interrupted and that a uniform air flow through the article 1 can be achieved.

The inductively heatable susceptor 12 comprises a plurality of elongate second strips comprising an inductively heatable susceptor material. The plurality of elongate second strips 13 constitute susceptor strips 18 and are also substantially oriented in the longitudinal direction of the aerosol generating article 1. The elongate second strips 13 are foldless in the longitudinal direction to prevent hot spots in the aerosol generating substrate 10.

The aerosol generating article 1 comprises a plurality of elongate third strips 17 (see FIG. 1*b*) comprising an aerosol generating material. The elongate third strips 17 also constitute aerosol generating strips 16 and are substantially oriented in the longitudinal direction of the aerosol generating article 1. The elongate third strips 17 have the same length as the elongate first strips 15, and thus the aerosol generating strips 16 within the aerosol generating article 1 all have the same length. The elongate second strips 13 are adhered to the elongate third strips 17, and the elongate second strips 13 and the elongate third strips 17 have the same width. In preferred embodiments, the elongate first strips 15 also have the same width as the elongate second strips 13 and the elongate third strips 17.

The elongate first strips 15, the elongate second strips 13 and the elongate third strips are arranged to form a substantially rod-shaped aerosol generating article 1 and can be randomly distributed throughout the cross-section of the rod-shaped aerosol generating article 1 such that they have a plurality of different orientations within the cross-section of the aerosol generating article 1. Although not apparent from FIG. 1*b*, a sufficient number of elongate first strips 15 are provided to substantially fill the cross-section of the aerosol generating substrate 10, and it will be understood that a smaller number of elongate first strips 15 are shown merely for illustration purposes. It should also be noted that any suitable number of elongate second strips 13 can be positioned in the aerosol generating substrate 10, depending on the heating requirements. Each of the elongate second strips 13 is advantageously surrounded by elongate first strips 15 thereby ensuring that heat transfer to the elongate first strips 15 is maximised and that the likelihood of contact between the elongate second strips 13 is minimised.

As best seen in FIG. 1*a*, each of the plurality of elongate first strips 15 has a distal end 15*a* and each of the plurality of elongate second strips 13 has a distal end 13*a*. The distal ends 15*a* of the elongate first strips 15 form the first end 10*a* of the aerosol generating substrate 10 and, correspondingly, the distal end 11*a* of the aerosol generating article 1. The elongate second strips 13 are shorter than the elongate first strips 15 and the elongate third strips 17. The distal ends 13*a* of the elongate second strips 13 are positioned inwardly from the distal ends 15*a* of the elongate first strips 15. The distal ends 13*a* of the elongate second strips 13 are, therefore, not visible at the distal end 11*a* of the aerosol generating article 1.

The aerosol generating article 1 comprises a mouthpiece segment 20 positioned downstream of the aerosol generating substrate 10. The aerosol generating substrate 10 and the mouthpiece segment 20 are arranged in coaxial alignment inside the wrapper to hold the components in position to form the rod-shaped aerosol generating article 1.

In the illustrated embodiment, the mouthpiece segment 20 comprises the following components arranged sequentially and in co-axial alignment in a downstream direction, in other words from the distal end 11*a* to the proximal (mouth) end 11*b* of the aerosol generating article 1: a cooling segment 22, a center hole segment 23 and a filter segment 24. The cooling segment 22 comprises a hollow paper tube 22*a* having a thickness which is greater than the thickness of the paper wrapper 14. The center hole segment may comprise a cured mixture containing cellulose acetate fibres and a plasticizer, and functions to increase the strength of the mouthpiece segment 20. The filter segment typically comprises cellulose acetate fibres and acts as a mouthpiece filter. As heated vapour flows from the aerosol generating substrate 10 towards the proximal (mouth) end 11*b* of the aerosol generating article 1, the vapour cools and condenses as it passes through the cooling segment 22 and the center hole segment 23 to form an aerosol with suitable characteristics for inhalation by a user through the filter segment 24.

The elongate first strips 15 and elongate third strips 17 typically comprise plant derived material, such as tobacco. The elongate first strips 15 and elongate third strips 17 can advantageously comprise reconstituted tobacco including tobacco and any one or more of cellulose fibres, tobacco stalk fibres and inorganic fillers such as CaCO3.

The elongate first strips 15 and elongate third strips 17 typically comprise an aerosol-former such as glycerine or propylene glycol. Typically, the elongate first strips 15 and elongate third strips 17 comprise an aerosol-former content of between approximately 5% and approximately 50% on a dry weight basis. Upon heating, the elongate first strips and elongate third strips 17 release volatile compounds possibly including nicotine or flavour compounds such as tobacco flavouring.

When a time varying electromagnetic field is applied in the vicinity of the elongate second strips 13 during use of the article 1 in an aerosol generating device, heat is generated in the elongate second strips 13 due to eddy currents and magnetic hysteresis losses. The heat is transferred from the elongate second strips 13 to the elongate first strips 15 and elongate third strips 17 to heat the elongate first strips 15 and elongate third strips 17 without burning them to release one or more volatile compounds and thereby generate a vapour. As a user inhales through the filter segment 24, the heated vapour is drawn in a downstream direction through the article 1 from the first end 10*a* of the aerosol generating substrate 10 towards the second end 10*b* of the aerosol generating substrate 10, and towards the filter segment 24. As noted above, as the heated vapour flows through the cooling segment 22 and the center hole segment 23 towards the filter segment 24, the heated vapour cools and condenses to form an aerosol with suitable characteristics for inhalation by a user through the filter segment 24.

Manufacture of Aerosol Generating Articles (Example 1)

Figure 2A:
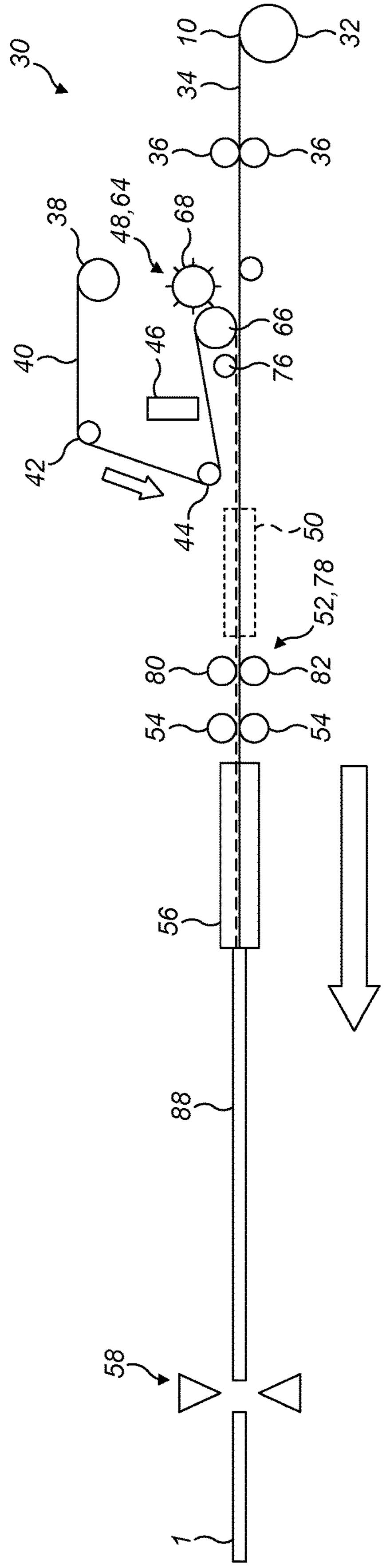
FIG. 2*a* is a diagrammatic illustration of an apparatus and method for manufacturing the first example of the aerosol generating article illustrated in FIGS. 1*a* and 1*b;*
Figure 2B:
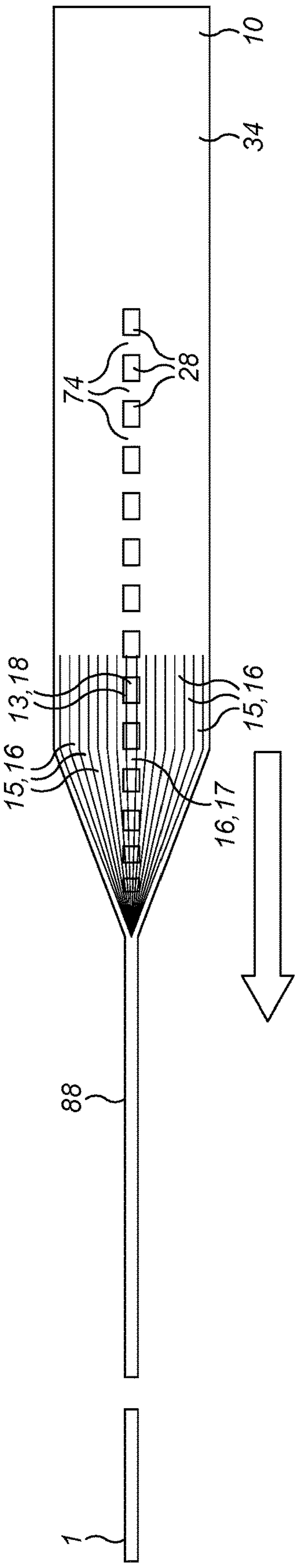
FIG. 2*b* is a plan view of an aerosol generating substrate and susceptor patches as the aerosol generating substrate and susceptor patches move in the direction shown by the arrow through the apparatus illustrated in FIG. 2*a;*

Referring to FIG. 2*a*, there is shown a diagrammatic illustration of an apparatus 30 and method for manufacturing the first example of the aerosol generating article 1 described above with reference to FIGS. 1*a* and 1*b*. FIG. 2*b* is a plan view of an aerosol generating substrate 10 and susceptor patches 28 as they move through the apparatus 30, in the direction of the arrow in FIG. 2*b*.

The apparatus 30 comprises a substrate supply reel 32 (e.g. a first bobbin) which carries a continuous web 34 of an aerosol generating substrate 10 having a substantially flat surface and first feed rollers 36 for controlling the feed of the continuous web 34 of aerosol generating substrate 10. The apparatus 30 may also include a web tension regulator and a web edge control system as will be understood by one of ordinary skill in the art, but these additional components are not essential in the context of the present disclosure and have, therefore, been omitted for the sake of simplicity.

The apparatus 30 comprises a susceptor supply reel 38 (e.g. a second bobbin) which carries a continuous web 40 of susceptor material, feed rollers 42, 44 for controlling the feed of the continuous web 40 of susceptor material, an adhesive applicator unit 46, and a susceptor cutting unit 48.

The apparatus 30 further comprises an optional heater 50, a strip cutting unit 52, feed rollers 54, a rod forming unit 56, and a rod cutting unit 58.

Susceptor Patch Preparation

Figure 3:
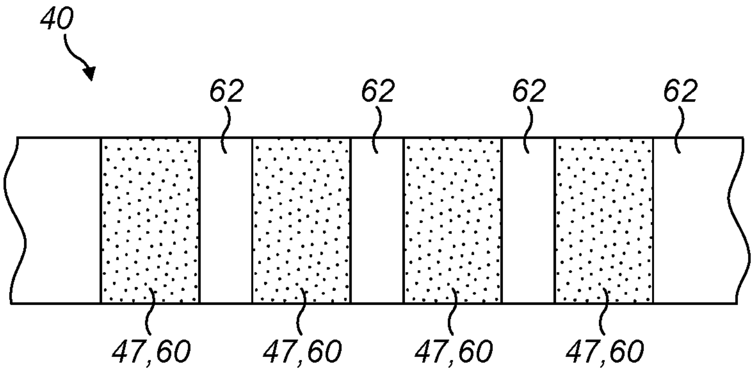
FIG. 3 is a plan view of a section of a continuous web of susceptor material showing adhesive areas and non-adhesive areas.

In operation, a continuous web 34 of aerosol generating substrate 10 is continuously supplied from the substrate supply reel 32. At the same time, a continuous web 40 of susceptor material is continuously supplied from the susceptor supply reel 38, via the feed rollers 42, 44, to the adhesive applicator unit 46. The adhesive applicator unit 46 applies an adhesive 47 to a surface of the continuous web 40 of susceptor material. In the illustrated example, the adhesive applicator unit 46 applies the adhesive 47 to the surface of the continuous web 40 of susceptor material intermittently, and across the full width of the web 40. In this way, discrete adhesive areas 60 (see FIGS. 3 and 4) are formed on the surface of the continuous web 40 of susceptor material, with adhesive-free areas 62 being formed between adjacent adhesive areas 60 in the direction of travel of the continuous web 40 of susceptor material.

The continuous web 40 of susceptor material is supplied from the adhesive applicator unit 46 to the susceptor cutting unit 48 which continuously cuts the continuous web 40 of susceptor material to form a plurality of susceptor patches 28. As best seen in FIG. 2*b*, the continuous web 40 of susceptor material, and hence the susceptor patches 28, have a width which is substantially less than a width of the continuous web 34 of aerosol generating substrate 10. For example, the continuous web 34 of aerosol generating substrate 10 can have a width of approximately 140 mm whereas the continuous web of susceptor material, and hence the susceptor patches 28, can have a width of between approximately 0.1 mm and 5 mm. In some embodiments, the susceptor patches can have a length of between approximately 5 mm and 50 mm in the direction of travel of the continuous web 40 of susceptor material and can have a thickness of between approximately 1 μm and 500 μm.

In order to minimise soiling of the susceptor cutting unit 48 by the adhesive 47 applied to the continuous web 40 of susceptor material by the adhesive applicator unit 46, the susceptor cutting unit 48 cuts the continuous web 40 of susceptor material in the adhesive-free areas 62, that is at positions between the adhesive areas 60 on the surface of the continuous web 40 of susceptor material. This can be achieved by synchronising the operation of the susceptor cutting unit 48 with the movement of the continuous web of susceptor material.

Figure 5:
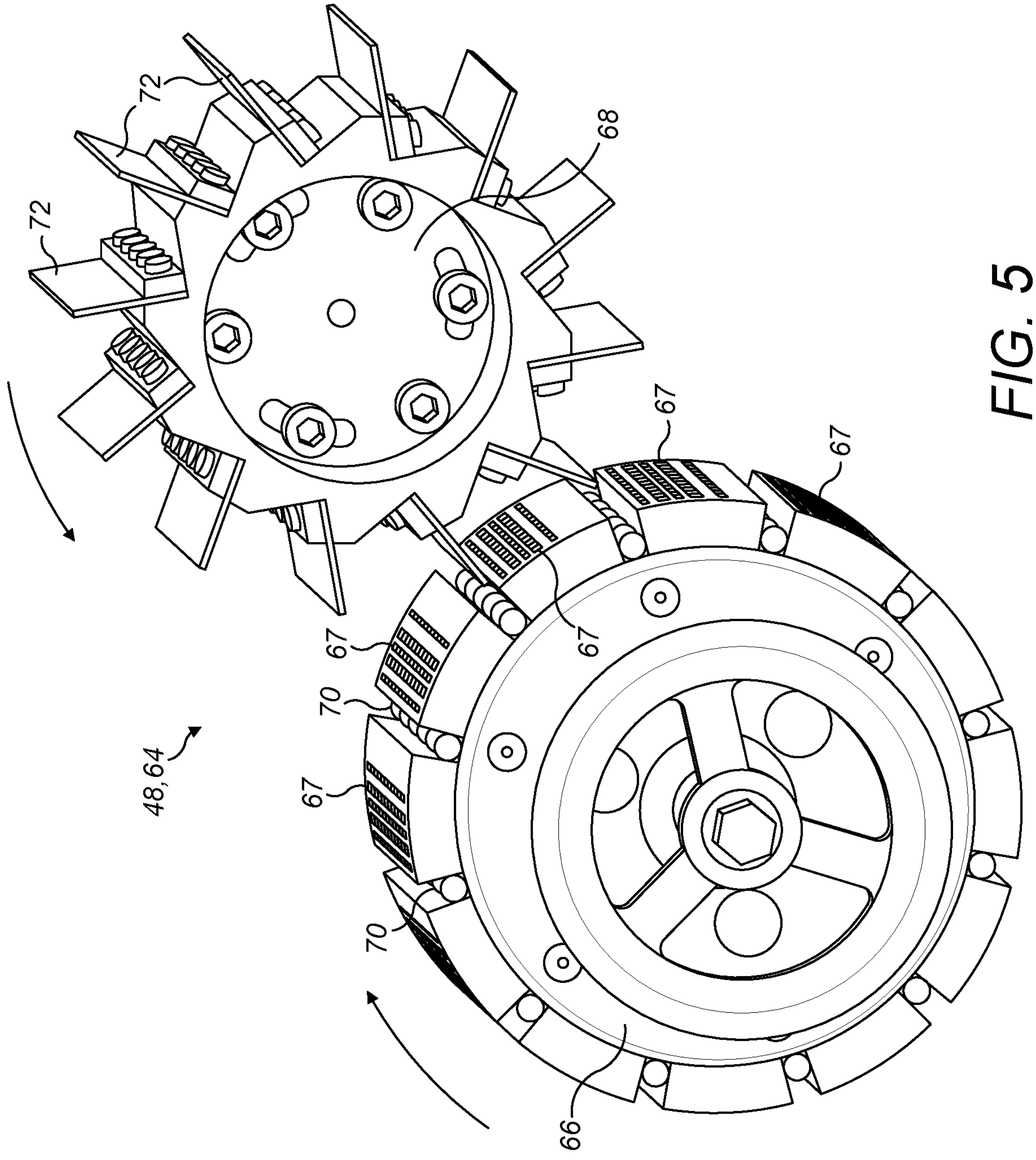
FIG. 5 is a diagrammatic perspective view of a susceptor cutting unit.

Referring to FIG. 5, the susceptor cutting unit 48 comprises a rotary cutting unit 64 comprising a support drum 66 and a cutting drum 68. The support drum 66 supports the continuous web 40 of susceptor material around its periphery and includes a plurality of circumferentially spaced recesses 70 around its periphery. The support drum 66 is typically a suction drum and the continuous web 40 of susceptor material and susceptor patches 28 are supported around the periphery of the suction drum by a suction force applied through suction ports 67. The cutting drum 68 includes a plurality of circumferentially spaced cutting elements 72, for example projecting cutting blades, around its periphery and the cutting elements 72 cooperate with (e.g., extend into) the circumferentially spaced recesses 70 during synchronised rotation of both the support drum 66 and the cutting drum 68 in opposite directions as shown by the arrows in FIG. 5. This results in continuous shear cutting of the continuous web 40 of susceptor material to form a plurality of susceptor patches 28.

Susceptor Patch Application

Figure 4:
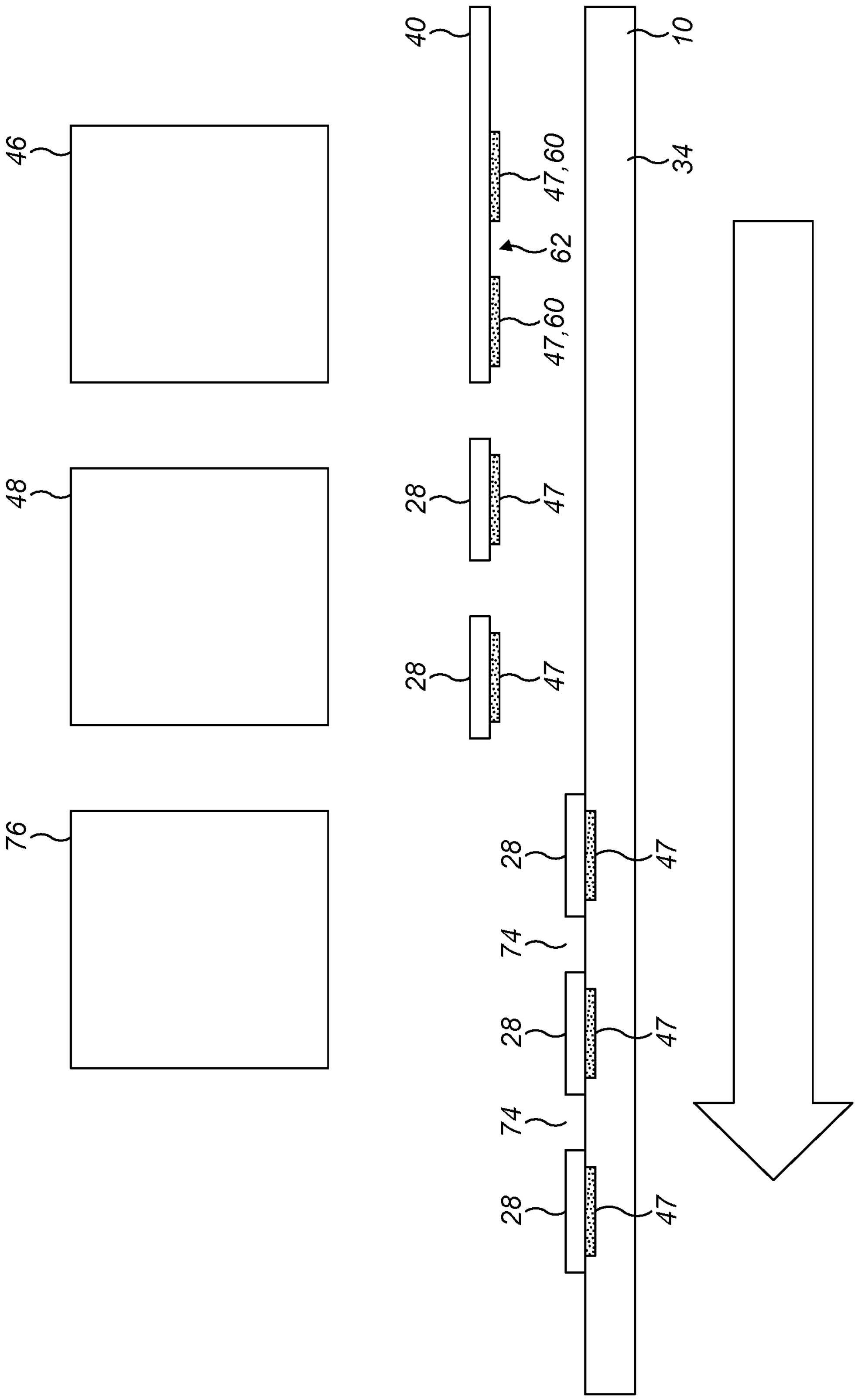
FIG. 4 is a functional illustration of part of the apparatus and method of FIG. 2*a* schematically illustrating the formation of susceptor patches from a continuous web of susceptor material and the application of the susceptor patches to a surface of a continuous web of aerosol generating substrate.

The susceptor patches 28 provided by the susceptor cutting unit 48 can be applied to the surface of the continuous web 40 of aerosol generating substrate 10 so that there is a constant and predetermined spacing 74 between the edges of each successive susceptor patch 28, for example as shown in FIGS. 2*b* and 4. The constant and predetermined spacing 74 may, for example, be between 1 mm and 20 mm. In order to generate the constant and predetermined spacing 74 between the edges of adjacent susceptor patches 28, the susceptor cutting unit 48 permits relative movement between the continuous web 40 of susceptor material and the support drum 66 for a predetermined period of time immediately after the continuous web 40 of susceptor material carried by the support drum 66 has been cut by the cutting drum 68 to form a susceptor patch 28. This relative movement allows the continuous web 40 of susceptor material to remain stationary or to travel at a reduced speed for a short period of time after a susceptor patch 28 has been cut from the continuous web 40 of susceptor material. The relative movement between the continuous web 40 of susceptor material and the support drum 66 can be achieved by, for example, reducing the suction force applied to the continuous web 40 of susceptor material by the support drum 66, whilst at the same time maintaining an adequate suction force between the already cut susceptor patches 28 and the support drum 66 to ensure that there is no relative movement between the susceptor patches 28 and the support drum 66.

In this way, a susceptor patch 28 that has been cut from the continuous web 40 of susceptor material by the susceptor cutting unit 48 is conveyed for a short period of time at a greater speed than the continuous web 40 of susceptor material from which the susceptor patch 28 has been cut, thereby generating the desired constant and predetermined spacing 74 between the edges of adjacent susceptor patches 28.

The susceptor patches 28 with the adhesive 47 applied thereto are continuously and consecutively adhered to the surface of the continuous web 34 of aerosol generating substrate 10 substantially along a centre line of the continuous web 34. Adjacent susceptor patches 28 are spaced apart in the direction of travel of the continuous web of aerosol generating substrate by the constant and predetermined spacing 74 between the edges of the susceptor patches 28 that is generated when the susceptor patches 28 are formed in the susceptor cutting unit 48. In order to ensure that there is adequate adhesion between the susceptor patches 28 and the substantially flat surface of the continuous web 34 of aerosol generating substrate 10, the susceptor patches 28 can be pressed onto the substantially flat surface by a cam roller 76, shown diagrammatically in FIG. 2*a*. The rotation of the cam roller 76 is synchronized with the movement of the continuous web 34 of aerosol generating substrate 10 so that a pressing force is applied to consecutive susceptor patches 28, but not to the spaced regions between consecutive susceptor patches 28.

Depending on the properties of the adhesive 47 applied to the continuous web 40 of susceptor material (and hence to the susceptor patches 28) by the adhesive applicator unit 46, the continuous web 34 of aerosol generating substrate 10 and the susceptor patches 28 adhered to the surface thereof can be heated by the optional heater 50. This may help to cure or set the adhesive 47, and thereby ensure a good bond between each susceptor patch 28 and the surface of the continuous web 34 of aerosol generating substrate 10. The heating temperature must be carefully selected based on the characteristics of both the aerosol generating substrate 10 and the adhesive 47, to ensure that sufficient heating is achieved to cure or set the adhesive 47, whilst at the same time avoiding or at least minimising the release of volatile components from the aerosol generating substrate 10.

Strip Cutting

The continuous web 34 of aerosol generating substrate 10 with the spaced susceptor patches 28 adhered to its surface is fed to the strip cutting unit 52 (best seen in FIG. 6) which simultaneously cuts the continuous web 34 of aerosol generating substrate 10 and the susceptor patches 28 to form a plurality of continuous aerosol generating strips and a plurality of susceptor strips 18. In an embodiment, the strip cutting unit 52 cuts the continuous web 34 of aerosol generating substrate 10 and the susceptor patches to form aerosol generating strips 16 and susceptor strips 18 having a strip width of approximately 1 mm. Thus, if the susceptor patches 28 have a width of 5 mm as discussed above, it will be understood that five susceptor strips 18 are formed by cutting each susceptor patch 28.

Figure 6:
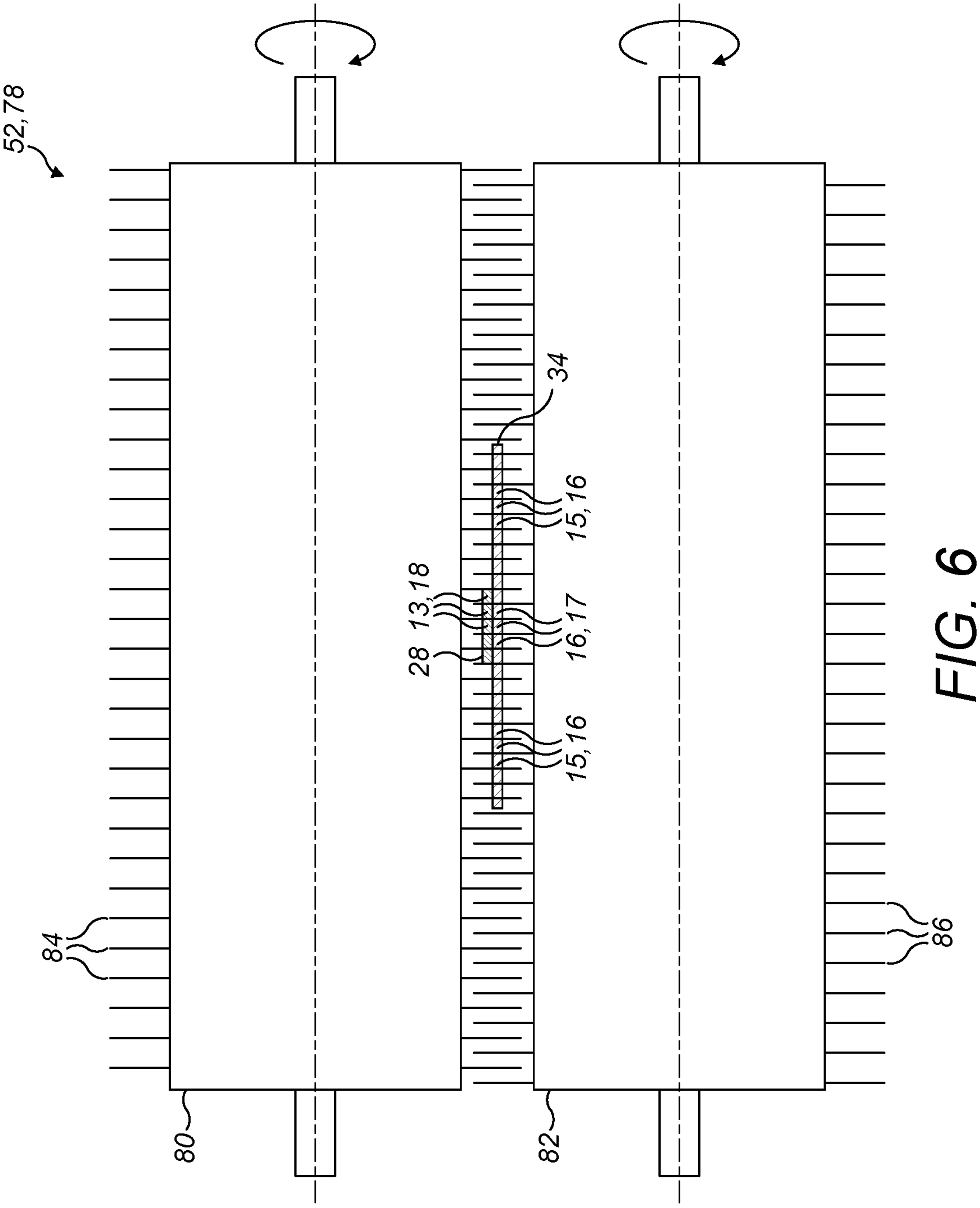
FIG. 6 is a diagrammatic illustration of a strip cutting unit of the apparatus of FIG. 2*a;*

The ends of the susceptor strips 18 formed by cutting the susceptor patches 28 are longitudinally spaced by the same predetermined and constant spacing 74 that was present between the edges of adjacent susceptor patches 28. As shown in FIGS. 2*a* and 6, the strip cutting unit 52 is a rotary cutter unit 78 and comprises first and second cutting drums 80, 82. The first cutting drum 80 includes circumferentially extending first cutting formations 84 and the second cutting drum 82 includes circumferentially extending second cutting formations 86. The first and second cutting formations 84, 86 cooperate (e.g., intermesh) to shear cut the continuous web 34 of aerosol generating substrate 10 and the susceptor patches 28 in the direction of travel of the continuous web 34 to form the plurality of aerosol generating strips 16 and the plurality of susceptor strips 18. As will be appreciated from FIGS. 2*b* and 6, the aerosol generating strips 16 formed by cutting the central region of the continuous web 34 of aerosol generating substrate 10 with susceptor patches 28 adhered to its surface have susceptor strips 18 (i.e., elongate second strips 13) adhered to them, and it is the aerosol generating strips formed by cutting this central region that constitute the elongate third strips 17. On the other hand, the aerosol generating strips 16 formed by cutting the side regions of the continuous web 34 of aerosol generating substrate 10, on opposite sides of the susceptor patches 28, do not have susceptor strips 18 adhered to them and it is the aerosol generating strips 16 formed by cutting these side regions that constitute the elongate first strips 15.

Rod Formation

The aerosol generating strips 16 and the susceptor strips 18 are conveyed to the rod forming unit 56 where they are formed into a continuous rod 88. If desired, a continuous sheet of wrapping paper (not shown) can be supplied to the rod forming unit 56 from a supply reel (not shown) or can be supplied to a separate wrapping unit (again from a supply reel) which can be positioned downstream of the rod forming unit 56. As the sheet of wrapping paper is transported and guided through the rod forming unit 56 or the separate wrapping unit, it can be wrapped around the aerosol generating strips 16 and the susceptor strips 18 so that the continuous rod 88 is circumscribed by a wrapper 14.

Rod Cutting

The continuous rod 88 (optionally circumscribed by a wrapper 14) is then transported to the rod cutting unit 58 where it is cut at appropriate positions into predetermined lengths to form multiple aerosol generating articles 1. The aerosol generating articles 1 formed by the rod cutting unit 58 may have a length between 5 mm and 50 mm, preferably between 10 mm and 30 mm. It will be understood that this length corresponds to the length of the aerosol generating substrate 10 described above with reference to FIGS. 1*a* and 1*b*. The continuous rod 88 is preferably cut repeatedly by the rod cutting unit 58 substantially at a midpoint between the ends of the susceptor strips 18 formed by cutting consecutive susceptor patches 28. In this way, the susceptor strips 18 are not cut by the rod cutting unit 58, thereby reducing wear on the cutting elements. Further, because the susceptor strips 18 are shorter than the aerosol generating strips 16, the ends of the susceptor strips 18 are not visible at either end of the aerosol generating articles 1 formed by the rod cutting unit 58. It will be understood that this type of method is particularly suitable for the mass production of aerosol generating articles 1.

Final Assembly

Further units (not shown) may be arranged downstream of the rod cutting unit 58 and may be configured to provide one or more additional components such as the mouthpiece segment 20 described above and to assemble these with the individual aerosol generating articles 1 formed by the rod cutting unit 56 to form finished aerosol generating articles 1, for example of the type illustrated in FIG. 1. In this case, a separate wrapping unit may be provided downstream of the rod cutting unit 58 so that the assembled components can be simultaneously wrapped to form the finished aerosol generating articles 1. The further units may form part of the apparatus 30 or may be separate, stand-alone, units forming part of a final assembly line.

Aerosol Generating Article (Example 2)

Figure 7A:
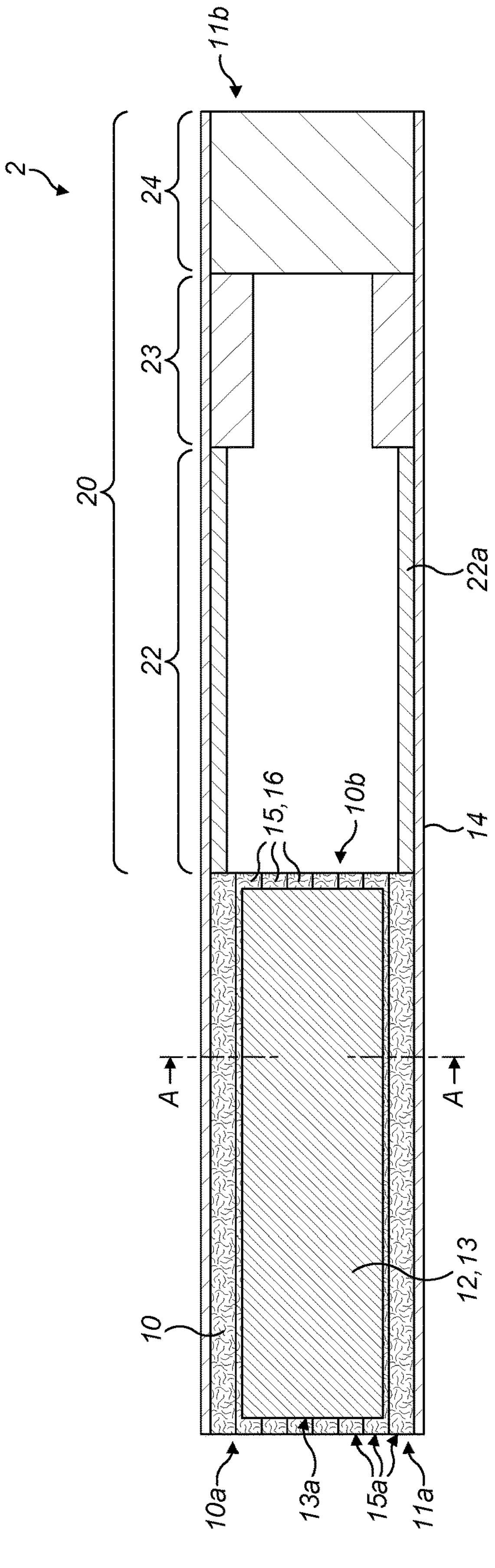
FIG. 7*a* is a diagrammatic cross-sectional side view of a second example of an aerosol generating article.
Figure 7B:
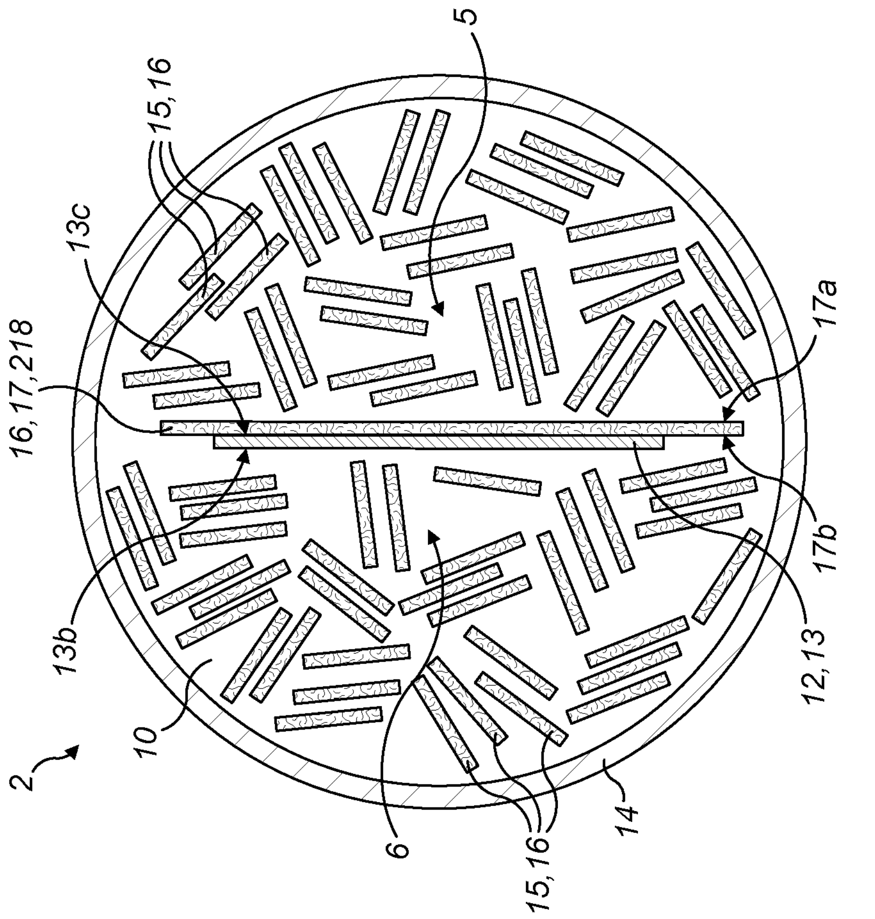
FIG. 7*b* is a diagrammatic cross-sectional view along the line A-A in FIG. 7*a;*

Referring now to FIGS. 7*a* and 7*b*, there is shown a second example of an aerosol generating article 2 for use with an aerosol generating device that comprises an induction heating system to inductively heat the aerosol generating article and thereby generate an aerosol for inhalation by a user of the device. The aerosol generating article is similar to the aerosol generating article 1 described above with reference to FIGS. 1*a* and 1*b* and corresponding components will be identified using the same reference numerals.

The aerosol generating article 2 comprises an aerosol generating substrate 10 having first and second ends 10*a*, 10*b* and an inductively heatable susceptor 12. The aerosol generating substrate 10 and the inductively heatable susceptor 12 are positioned in, and enclosed by, a wrapper 14. The wrapper 14 comprises a material which is substantially non-electrically conductive and non-magnetically permeable. In the illustrated example, the wrapper 14 is a paper wrapper and may comprise cigarette paper.

The aerosol generating article 2 typically has a total length, measured between the distal end 11*a* and the proximal (mouth) end 11*b*, between 30 mm and 100 mm, preferably between 50 mm and 70 mm. The aerosol generating substrate 10 typically has a total length, measured between the first and second ends 10*a*, 10*b*, between 5 mm and 50 mm, preferably between 10 mm and 30 mm. The aerosol generating article 1 typically has a diameter between 5 mm and 10 mm, preferably between 6 mm and 8 mm.

The aerosol generating substrate 10 comprises a plurality of elongate first strips 15 comprising an aerosol generating material. The plurality of elongate first strips 15 constitute aerosol generating strips 16 and are substantially oriented in a longitudinal direction of the aerosol generating article 2. The elongate first strips 15 are typically foldless in the longitudinal direction to ensure that the air flow route is not interrupted and that a uniform air flow through the article 2 can be achieved.

The inductively heatable susceptor 12 comprises an elongate second strip 13 comprising an inductively heatable susceptor material. The elongate second strip 13 can, therefore, be regarded as a strip-shaped or blade-shaped elongate susceptor 12 which is also substantially oriented in the longitudinal direction of the aerosol generating article 2. As can be clearly seen in FIG. 7*b*, each of the elongate first strips 15 has a width which is less than a width of the elongate second strip 13.

The aerosol generating article 2 comprises at least one elongate carrier strip 17 having first and second major surfaces 17*a*, 17*b*. The elongate carrier strip 17 comprises an aerosol generating material and, thus, also constitutes an aerosol generating strip 16. The elongate carrier strip 17 is substantially oriented in the longitudinal direction of the aerosol generating article 2. The elongate carrier strip 17 has the same length as the elongate first strips 15, and thus the aerosol generating strips 16 within the aerosol generating article 2 all have the same length.

The elongate second strip 13 is adhered to the elongate carrier strip 17 and, as can be clearly seen in FIG. 7*b*, the elongate carrier strip 17 has a width which is greater than the width of the elongate second strip 13. The elongate second strip 13 has first and second opposite faces 13*b*, 13*c*. The second face 13*c* is adhered to the second major surface 17*b* of the elongate carrier strip 17 and is covered in its entirety by the elongate carrier strip 17, and more particularly by the second major surface 17*b*.

The elongate first strips 15, the elongate second strip 13 and the elongate carrier strip are arranged to form a substantially rod-shaped aerosol generating article 2 and the elongate first strips 15 can be randomly distributed throughout the cross-section of the rod-shaped aerosol generating article 2 such that they have a plurality of different orientations within the cross-section of the aerosol generating article 2. Although not apparent from FIG. 7*b*, a sufficient number of elongate first strips 15 are provided to substantially fill the cross-section of the aerosol generating substrate 10, and it will be understood that a smaller number of elongate first strips 15 are shown merely for illustration purposes. The elongate second strip 13 and the elongate carrier strip 17 are positioned roughly centrally within the cross-section of the aerosol generating substrate 10, and hence the aerosol generating article 2. Such an arrangement helps to ensure that there is uniform heat transfer from the elongate second strip 13 to the elongate first strips 15.

As best seen in FIG. 7*b*, the centrally positioned elongate carrier strip 17 and the elongate second strip 13 adhered thereto define first and second regions 5, 6 within the cross-section of the aerosol generating substrate 10 and, hence, within the cross-section of the aerosol generating article 2. The first region 5 faces the first major surface 17*a* of the elongate carrier strip 17 and the second region 6 faces the second major surface 17*b* of the elongate carrier strip 17. The first and second regions 5, 6 both include a plurality of elongate first strips 15.

As best seen in FIG. 7*a*, each of the plurality of elongate first strips 15 has a distal end 15*a* and the elongate second strip 13 has a distal end 13*a*. The distal ends 15*a* of the elongate first strips 15 form the first end 10*a* of the aerosol generating substrate 10 and, correspondingly, the distal end 11*a* of the aerosol generating article 2. The elongate second strip 13 is shorter than the elongate first strips 15 and the elongate carrier strip 17. The distal end 13*a* of the elongate second strip 13 is positioned inwardly from the distal ends 15*a* of the elongate first strips 15. The distal end 13*a* of the elongate second strip 13 (i.e., the elongate susceptor 12) is, therefore, not visible at the distal end 11*a* of the aerosol generating article 2.

The aerosol generating article 2 comprises a mouthpiece segment 20 positioned downstream of the aerosol generating substrate 10. The aerosol generating substrate 10 and the mouthpiece segment 20 are arranged in coaxial alignment inside the wrapper 14 to hold the components in position to form the rod-shaped aerosol generating article 2. The mouthpiece segment 20 has the same construction, and includes the same components, as the mouthpiece segment 20 described above in connection with the first example of the aerosol generating article 1.

The elongate first strips 15 and the elongate carrier strip 17 typically comprise plant derived material, such as tobacco. The elongate first strips 15 and the elongate carrier strip 17 can advantageously comprise reconstituted tobacco including tobacco and any one or more of cellulose fibres, tobacco stalk fibres and inorganic fillers such as CaCO3.

The elongate first strips 15 and the elongate carrier strip 17 typically comprise an aerosol-former such as glycerine or propylene glycol. Typically, the elongate first strips and the elongate carrier strip 17 comprise an aerosol-former content of between approximately 5% and approximately 50% on a dry weight basis. Upon heating, the elongate first strips 15 and the elongate carrier strip 17 release volatile compounds possibly including nicotine or flavour compounds such as tobacco flavouring.

When a time varying electromagnetic field is applied in the vicinity of the elongate second strip 13 during use of the article 2 in an aerosol generating device, heat is generated in the elongate second strip 13 due to eddy currents and magnetic hysteresis losses. The heat is transferred from the elongate second strip 13 to the elongate first strips 15 and the elongate carrier strip 17 to heat the elongate first strips 15 and the elongate carrier strip 17 without burning them to release one or more volatile compounds and thereby generate a vapour. As a user inhales through the filter segment 24, the heated vapour is drawn in a downstream direction through the article 2 from the first end 10*a* of the aerosol generating substrate 10 towards the second end 10*b* of the aerosol generating substrate 10, and towards the filter segment 24. As the heated vapour flows through the cooling segment 22 and the center hole segment 23 towards the filter segment 24, the heated vapour cools and condenses to form an aerosol with suitable characteristics for inhalation by a user through the filter segment 24.

Manufacture of Aerosol Generating Articles (Example 2): Embodiment 1

Figure 8A:
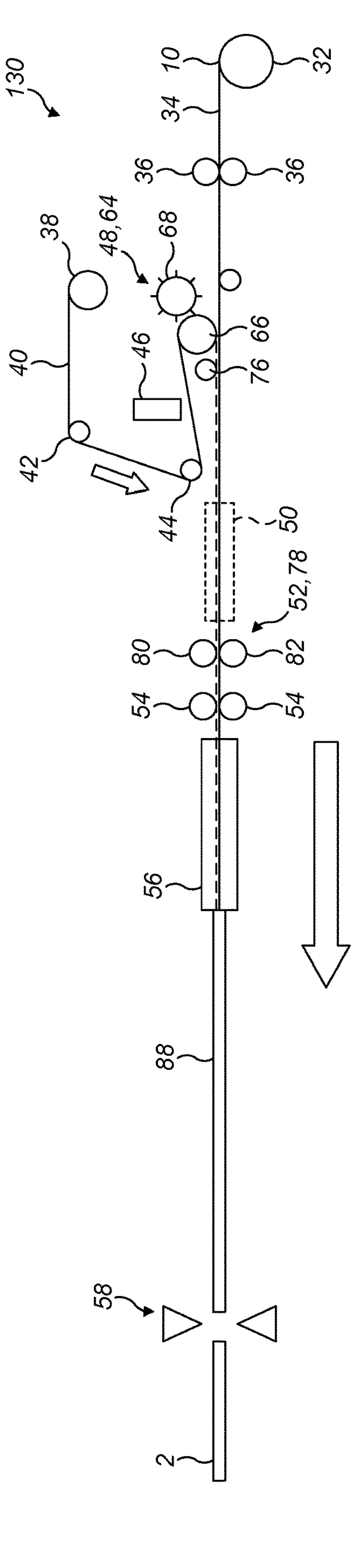
FIG. 8*a* is a diagrammatic illustration of a first embodiment of an apparatus and method for manufacturing the second example of the aerosol generating article illustrated in FIGS. 7*a* and 7*b;*
Figure 8B:
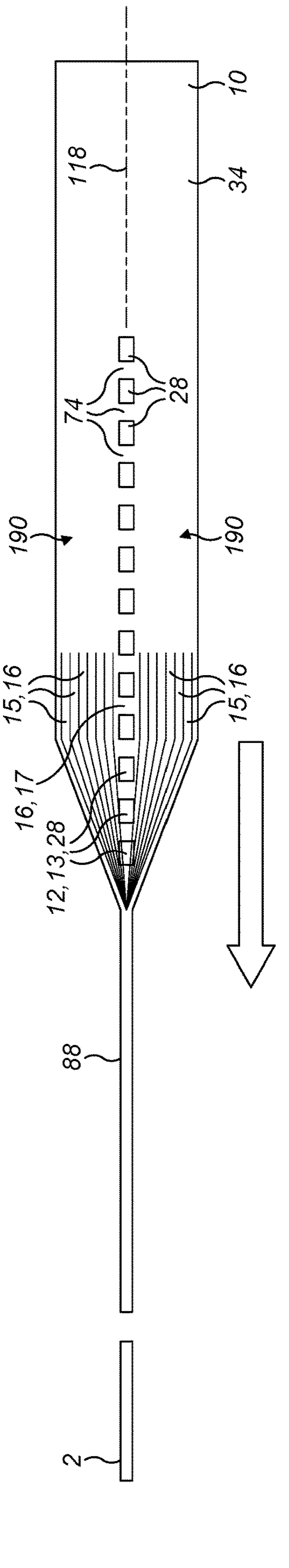
FIG. 8*b* is a plan view of an aerosol generating substrate and susceptor patches as the aerosol generating substrate and susceptor patches move in the direction shown by the arrow through the apparatus illustrated in FIG. 8*a;*

Referring to FIG. 8*a*, there is shown a diagrammatic illustration of a first embodiment of an apparatus 130 and method for manufacturing the second example of the aerosol generating article 2 described above with reference to FIGS. 7*a* and 7*b*. FIG. 8*b* is a plan view of an aerosol generating substrate 10 and susceptor patches 28 as they move through the apparatus 130, in the direction of the arrow in FIG. 8*b*. The apparatus 130 and method are similar to the apparatus 30 and method described above with reference to FIGS. 2 to 6 and corresponding components will be identified using the same reference numerals.

The apparatus 130 comprises a substrate supply reel 32 (e.g. a first bobbin) which carries a continuous web 34 of an aerosol generating substrate 10 having a substantially flat surface with a centre line 118 and first feed rollers 36 for controlling the feed of the continuous web 34 of aerosol generating substrate 10. The apparatus 130 may also include a web tension regulator and a web edge control system as will be understood by one of ordinary skill in the art, but these additional components are not essential in the context of the present disclosure and have, therefore, been omitted for the sake of simplicity.

The apparatus 130 comprises a susceptor supply reel 38 (e.g. a second bobbin) which carries a continuous web 40 of susceptor material, feed rollers 42, 44 for controlling the feed of the continuous web 40 of susceptor material, an adhesive applicator unit 46, and a susceptor cutting unit 48.

The apparatus 130 further comprises an optional heater 50, a strip cutting unit 52, feed rollers 54, a rod forming unit 56, and a rod cutting unit 58.

Susceptor Patch Preparation

In operation, a continuous web 34 of aerosol generating substrate 10 is continuously supplied from the substrate supply reel 32. At the same time, susceptor patches 28 are prepared in exactly the same manner described above in connection with the apparatus and corresponding method, and the details will not be repeated. As will become apparent from the description below, each susceptor patch 28 corresponds to the elongate second strip 13 (i.e., the elongate susceptor 12) in the finished aerosol generating article 2 described above with reference to FIGS. 7*a* and 7*b*.

Susceptor Patch Application

The susceptor patches 28 provided by the susceptor cutting unit 48 can be applied to the surface of the continuous web 34 of aerosol generating substrate 10 so that there is a constant and predetermined spacing 74 between the edges of each successive susceptor patch 28, for example as shown in FIGS. 8*b* and 4. The constant and predetermined spacing 74, which may, for example, be between 1 mm and 20 mm, is achieved in the same manner described above in connection with the apparatus 30 and corresponding method.

The susceptor patches 28 with the adhesive 47 applied thereto are continuously and consecutively adhered to the flat surface of the continuous web 34 of aerosol generating substrate 10 substantially along the centre line 118. Exposed side regions 190 of the continuous web 34 of aerosol generating substrate are thereby formed on both sides of the susceptor patches 28 (see FIG. 8*b*) because, as noted above, the continuous web of aerosol generating substrate 10 is substantially wider than the susceptor patches 28. Adjacent susceptor patches 28 are also spaced apart in the direction of travel of the continuous web 34 of aerosol generating substrate 10 by the constant and predetermined spacing 74 between the edges of the susceptor patches 28 that is generated when the susceptor patches 28 are formed in the susceptor cutting unit 48.

In order to ensure that there is adequate adhesion between the susceptor patches 28 and the substantially flat surface of the continuous web 34 of aerosol generating substrate 10, the susceptor patches 28 can be pressed onto the substantially flat surface by a cam roller 76, shown diagrammatically in FIG. 8*a*. The rotation of the cam roller 76 is synchronized with the movement of the continuous web 34 of aerosol generating substrate 10 so that a pressing force is applied to consecutive susceptor patches 28, but not to the spaced regions between consecutive susceptor patches 28.

Depending on the properties of the adhesive 47 applied to the continuous web 40 of susceptor material (and hence to the susceptor patches 28) by the adhesive applicator unit 46, the continuous web 34 of aerosol generating substrate 10 and the susceptor patches 28 adhered to the surface thereof can be heated by the optional heater 50. As noted above, this may help to cure or set the adhesive 47, and thereby ensure a good bond between each susceptor patch 28 and the flat surface of the continuous web 34 of aerosol generating substrate 10.

Strip Cutting

Figure 9:
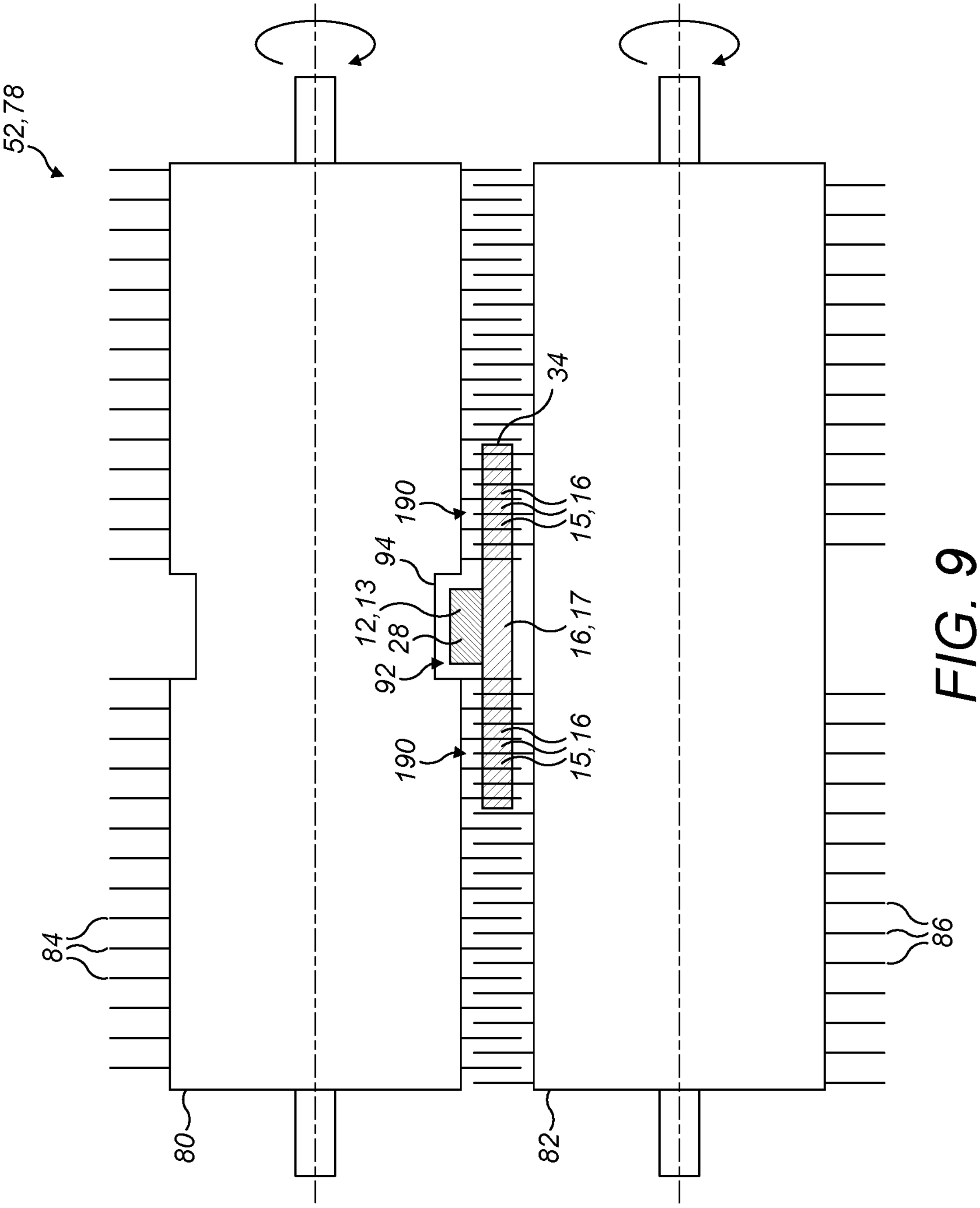
FIG. 9 is a diagrammatic illustration of a strip cutting unit of the apparatus of FIG. 8*a;*

The continuous web 34 of aerosol generating substrate 10 with the spaced susceptor patches 28 adhered to its flat surface is fed to the strip cutting unit 52 (best seen in FIG. 9). The strip cutting unit 52 cuts only the exposed side regions 190 of the continuous web 34 of aerosol generating substrate 10, without cutting the susceptor patches 28, to form a plurality of continuous aerosol generating strips 16 alongside the susceptor patches 28. In an embodiment, the strip cutting unit 52 cuts the exposed side regions 190 of the continuous web 34 of aerosol generating substrate 10 to form aerosol generating strips 16 having a strip width of approximately 1 mm.

As shown in FIGS. 8*a* and 9, the strip cutting unit 52 is a rotary cutter unit 78 and comprises first and second cutting drums 80, 82. The first cutting drum 80 includes circumferentially extending first cutting formations 84 and the second cutting drum 82 includes circumferentially extending second cutting formations 86. The first and second cutting formations 84, 86 cooperate (e.g., intermesh) to shear cut the exposed side regions 190 of the continuous web 34 of aerosol generating substrate 10 in the direction of travel of the continuous web 34 to form the continuous aerosol generating strips 16, and specifically to form the elongate first strips 15 illustrated in FIGS. 7*a* and 7*b*.

In order to provide for cutting of only the exposed side regions 190 of the continuous web 34 of aerosol generating substrate 10 to form the elongate first strips 15, the first and second cutting drums 80, 82 define therebetween a non-cutting region 92 which accommodates the susceptor patch 28 and the part of the continuous web 34 of aerosol generating substrate 10 to which the susceptor patch 28 is adhered. In the illustrated embodiment, the first cutting drum 80 is formed without the first cutting formations 84 in the non-cutting region 92. Similarly, the second cutting drum 82 is also formed without the second cutting formations 86 in the non-cutting region 92. Furthermore, the first cutting drum 80 includes a circumferentially extending recess 94 in its surface in the non-cutting region 92, so that at least part of the susceptor patch 28 can be accommodated in the circumferentially extending recess 94 during cutting of the exposed side regions 190 of the continuous web 34 of aerosol generating substrate 10. It will, thus, be understood that when the exposed side regions 190 of the continuous web 34 of aerosol generating substrate 10 are cut to form the elongate first strips 15 by virtue of the cooperation between the first and second cutting formations 84, 86 on the first and second cutting drums 80, 82 respectively, the central portion of the continuous web 34 of aerosol generating substrate 10 that is accommodated in the non-cutting region 92 and that is not cut into strips constitutes the elongate carrier strip 17 described above with reference to FIG. 7*b*.

Rod Formation

The aerosol generating strips 16 formed by cutting the exposed side regions 190 of the continuous web 34 of aerosol generating substrate 10, the elongate carrier strip 17 and the adhered susceptor patches 28 are conveyed to the rod forming unit 56 where they are formed into a continuous rod 88. If desired, a continuous sheet of wrapping paper (not shown) can be supplied to the rod forming unit 56 from a supply reel (not shown) or can be supplied to a separate wrapping unit (again from a supply reel) which can be positioned downstream of the rod forming unit 56. As the sheet of wrapping paper is transported and guided through the rod forming unit 56 or the separate wrapping unit, it can be wrapped around the aerosol generating strips 16 and the susceptor patches 28 so that the continuous rod 88 is circumscribed by a wrapper 14.

Rod Cutting

The continuous rod 88 (optionally circumscribed by a wrapper 14) is then transported to the rod cutting unit 58 where it is cut at appropriate positions into predetermined lengths to form multiple aerosol generating articles 2. The aerosol generating articles 2 formed by the rod cutting unit 58 may have a length between 5 mm and 50 mm, preferably between 10 mm and 30 mm. It will be understood that this length corresponds to the length of the aerosol generating substrate 10 described above with reference to FIGS. 7*a* and 7*b*. The continuous rod 88 is preferably cut repeatedly by the rod cutting unit 58 substantially at a midpoint between the edges of the susceptor patches 28. In this way, the susceptor patches 28 are not cut by the rod cutting unit 58, thereby reducing wear on the cutting elements. Further, because the susceptor patches are shorter than the aerosol generating strips 16, the ends of the individual susceptor patches 28 (i.e., the elongate second strips 13) are not visible at either end of the aerosol generating articles 2 formed by the rod cutting unit 58. It will be understood that this type of method is particularly suitable for the mass production of aerosol generating articles 2.

Final Assembly

Further units (not shown) may be arranged downstream of the rod cutting unit 58 and may be configured to provide one or more additional components such as the mouthpiece segment 20 described above and to assemble these with the individual aerosol generating articles 2 formed by the rod cutting unit 56 to form finished aerosol generating articles 2, for example of the type illustrated in FIG. 7. In this case, a separate wrapping unit may be provided downstream of the rod cutting unit 58 so that the assembled components can be simultaneously wrapped to form the finished aerosol generating articles 2. The further units may form part of the apparatus 130 or may be separate, stand-alone, units forming part of a final assembly line.

Manufacture of Aerosol Generating Articles (Example 2): Embodiment 2

Figure 10A:
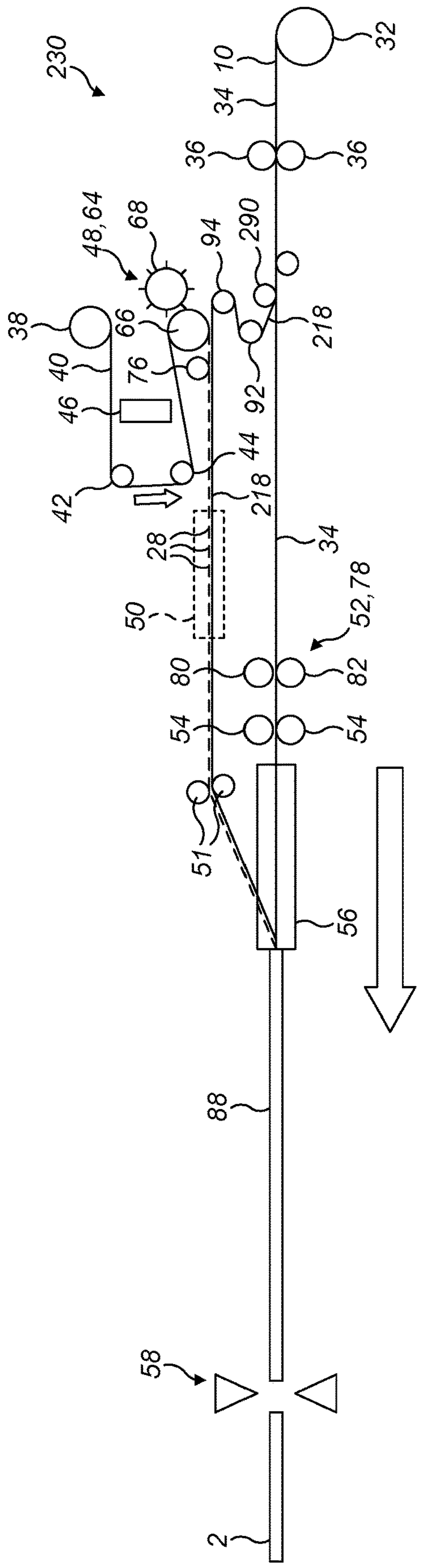
FIG. 10*a* is a diagrammatic illustration of a second embodiment of an apparatus and method for manufacturing the second example of the aerosol generating article illustrated in FIGS. 7*a* and 7*b;*
Figure 10B:
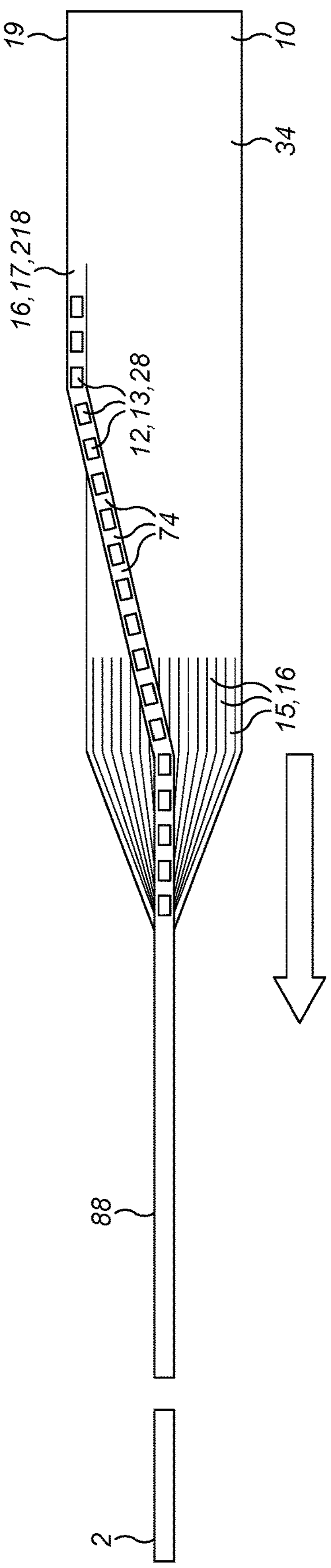
FIG. 10*b* is a plan view of an aerosol generating substrate and susceptor patches as the aerosol generating substrate and susceptor patches move in the direction shown by the arrow through the apparatus illustrated in FIG. 8*a;*

Referring to FIG. 10*a*, there is shown a diagrammatic illustration of a second embodiment of an apparatus 230 and method for manufacturing the second example of the aerosol generating article 2 described above with reference to FIGS. 7*a* and 7*b*. FIG. 10*b* is a plan view of an aerosol generating substrate 10 and susceptor patches 28 as they move through the apparatus 230, in the direction of the arrow in FIG. 10*b*. The apparatus 230 and method are similar to the apparatus 30, 130 and method described above with reference to FIGS. 2 to 6 and FIGS. 8 to 9 and corresponding components will be identified using the same reference numerals.

The apparatus 230 comprises a substrate supply reel 32 (e.g. a first bobbin) which carries a continuous web 34 of an aerosol generating substrate 10 having a substantially flat surface and first feed rollers 36 for controlling the feed of the continuous web 34 of aerosol generating substrate 10. The apparatus 230 may also include a web tension regulator and a web edge control system as will be understood by one of ordinary skill in the art, but these additional components are not essential in the context of the present disclosure and have, therefore, been omitted for the sake of simplicity.

The apparatus 230 further comprises a rotary cutter unit 290, for example including a circular cutting knife, which cuts the continuous web 34 of aerosol generating substrate 10 along one edge 19 to separate a continuous strip 218 of aerosol generating substrate from the continuous web 34. The continuous strip 218 of aerosol generating substrate 10 corresponds to the elongate carrier strip 17 in the finished aerosol generating article 2 described above with reference to FIGS. 7*a* and 7*b*. The continuous strip 218 of aerosol generating substrate 10 has a substantially flat surface and is transported away from the continuous web 34 of aerosol generating substrate 10, for example in an upward direction as best seen in FIG. 10*a*, by transport rollers 92, so that the continuous strip 218 and the continuous web 34 can be processed separately by the apparatus 230.

The apparatus 230 also comprises a susceptor supply reel 38 (e.g. a second bobbin) which carries a continuous web 40 of susceptor material, feed rollers 42, 44 for controlling the feed of the continuous web 40 of susceptor material, an adhesive applicator unit 46, and a susceptor cutting unit 48.

The apparatus 230 further comprises an optional heater 50, feed rollers 51, a strip cutting unit 52, feed rollers 54, a rod forming unit 56, and a rod cutting unit 58.

Susceptor Patch Preparation

In operation, a continuous web 34 of aerosol generating substrate 10 is continuously supplied from the substrate supply reel 32 and a continuous strip 218 of aerosol generating substrate 10 is separated from an edge 19 of the continuous web 34 by the rotary cutter unit 290 and transported away from the continuous web 34 by the transport rollers 92, 94 as described above. At the same time, a continuous web 40 of susceptor material is continuously supplied from the susceptor supply reel 38, via the feed rollers 42, 44, to the adhesive applicator unit 46. The adhesive applicator unit 46 applies an adhesive 47 to a surface of the continuous web 40 of susceptor material. In the illustrated example, the adhesive applicator unit 46 applies the adhesive 47 to the surface of the continuous web 40 of susceptor material intermittently, and across the full width of the web 40. In this way, discrete adhesive areas 60 (see FIGS. 3 and 11) are formed on the surface of the continuous web 40 of susceptor material, with adhesive-free areas 62 being formed between adjacent adhesive areas 60 in the direction of travel of the continuous web 40 of susceptor material.

The continuous web 40 of susceptor material is supplied from the adhesive applicator unit 46 to the susceptor cutting unit 48 which continuously cuts the continuous web 40 of susceptor material to form a plurality of susceptor patches 28. The construction and operation of the susceptor cutting unit 48 is the same as that described above in connection with FIG. 5. As will become apparent from the description below, each susceptor patch 28 corresponds to the elongate second strip 13 (i.e., the elongate susceptor 12) in the finished aerosol generating article 2 described above with reference to FIGS. 7*a* and 7*b*.

As best seen in FIG. 10*b*, the continuous web 40 of susceptor material, and hence the susceptor patches 28, have a width which is less than a width of the continuous strip of aerosol generating substrate 10. For example, the continuous web 40 of susceptor material, and hence the susceptor patches 28, can have a width of between approximately 0.1 mm and 7 mm. In some embodiments, the susceptor patches 28 can have a length of between approximately 5 mm and 50 mm in the direction of travel of the continuous web 40 of susceptor material and can have a thickness of between approximately 1 μm and 500 μm.

In order to minimise soiling of the susceptor cutting unit 48 by the adhesive 47 applied to the continuous web 40 of susceptor material by the adhesive applicator unit 46, the susceptor cutting unit 48 cuts the continuous web 40 of susceptor material in the adhesive-free areas 62, that is at positions between the adhesive areas 60 on the surface of the continuous web 40 of susceptor material. This can be achieved by synchronising the operation of the susceptor cutting unit 48 with the movement of the continuous web of susceptor material.

Susceptor Patch Application

Figure 11:
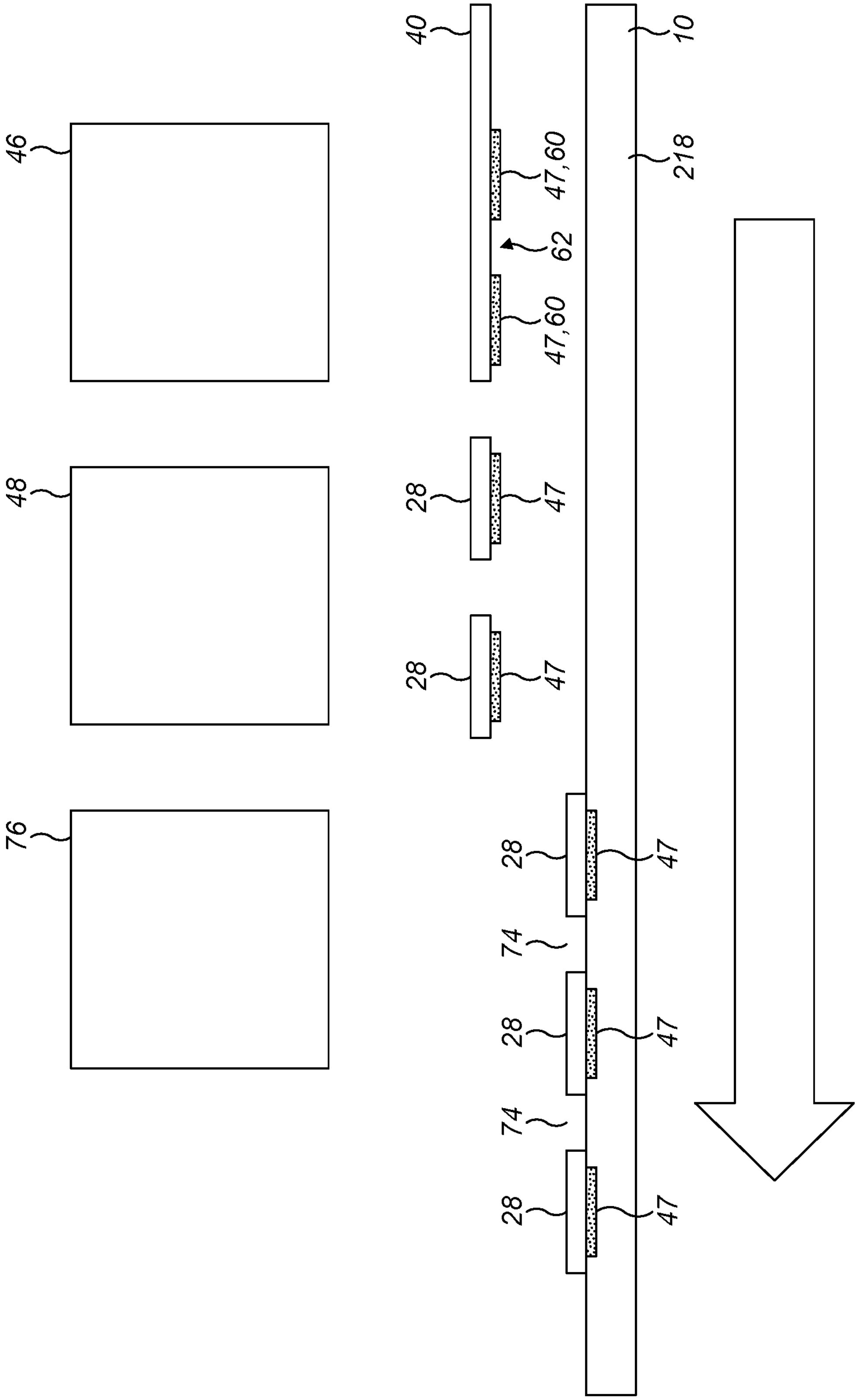
FIG. 11 is a functional illustration of part of the apparatus and method of FIG. 10*a* schematically illustrating the formation of susceptor patches from a continuous web of susceptor material and the application of the susceptor patches to a surface of a continuous strip of aerosol generating substrate.

The susceptor patches 28 provided by the susceptor cutting unit 48 can be applied to the flat surface of the continuous strip 218 of aerosol generating substrate 10 so that there is a constant and predetermined spacing 74 between the edges of each successive susceptor patch 28, for example as shown in FIGS. 10*b* and 11. The constant and predetermined spacing 74, which may, for example, be between 1 mm and 20 mm, is achieved in the same manner described above in connection with the apparatus 30 and corresponding method.

The susceptor patches 28 with the adhesive 47 applied thereto are continuously and consecutively adhered to the flat surface of the continuous strip 218 of aerosol generating substrate 10 substantially along a centre of the continuous strip 218. Adjacent susceptor patches 28 are spaced apart in the direction of travel of the continuous strip 218 of aerosol generating substrate 10 by the constant and predetermined spacing 74 between the edges of the susceptor patches 28 that is generated when the susceptor patches 28 are formed in the susceptor cutting unit 48.

In order to ensure that there is adequate adhesion between the susceptor patches 28 and the substantially flat surface of the continuous strip 218 of aerosol generating substrate 10, the susceptor patches 28 can be pressed onto the substantially flat surface by a cam roller 76, shown diagrammatically in FIG. 10*a*. The rotation of the cam roller 76 is synchronized with the movement of the continuous strip 218 of aerosol generating substrate 10 so that a pressing force is applied to consecutive susceptor patches 28, but not to the spaced regions between consecutive susceptor patches 28.

Depending on the properties of the adhesive 47 applied to the continuous web 40 of susceptor material (and hence to the susceptor patches 28) by the adhesive applicator unit 46, the continuous strip 218 of aerosol generating substrate 10 and the susceptor patches 28 adhered to the surface thereof can be heated by the optional heater 50. As noted above, this may help to cure or set the adhesive 47, and thereby ensure a good bond between each susceptor patch 28 and the flat surface of the continuous strip 218 of aerosol generating substrate 10.

Strip Cutting

Figure 12:
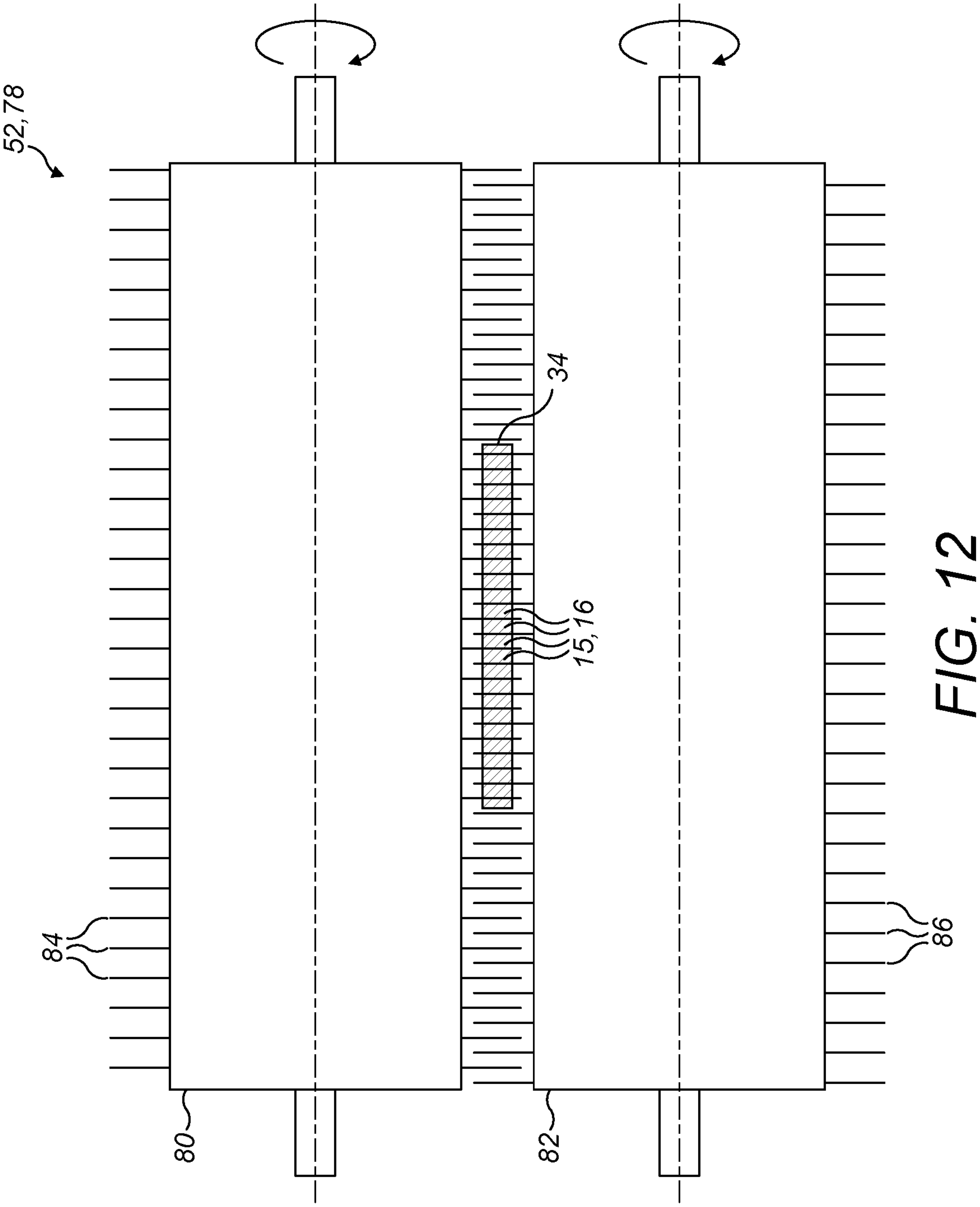
FIG. 12 is a diagrammatic illustration of a strip cutting unit of the apparatus of FIG. 10*a*.

After the continuous strip 218 of aerosol generating substrate 10 has been separated from an edge 19 of the continuous web 34 of aerosol generating substrate 10 by the rotary cutter unit 290, the remaining web 34 of aerosol generating substrate 10 is fed to the strip cutting unit 52 (best seen in FIG. 12). The strip cutting unit 52 cuts the continuous web 34 of aerosol generating substrate 10 across its full width to form a plurality of continuous aerosol generating strips 16 which correspond to the elongate first strips 15 in the finished aerosol generating article 2 described above with reference to FIGS. 7*a* and 7*b*. In an embodiment, the strip cutting unit 52 cuts the continuous web 34 of aerosol generating substrate 10 to form aerosol generating strips 16 having a strip width of approximately 1 mm.

As shown in FIGS. 10*a* and 12, the strip cutting unit 52 is a rotary cutter unit 78 and comprises first and second cutting drums 80, 82. The first cutting drum 80 includes circumferentially extending first cutting formations 84 and the second cutting drum 82 includes circumferentially extending second cutting formations 86. The first and second cutting formations 84, 86 cooperate (e.g. intermesh) to shear cut the continuous web 34 of aerosol generating substrate 10 in the direction of travel of the continuous web 34 to form the plurality of aerosol generating strips 16, and specifically to form the elongate first strips 15 illustrated in FIGS. 7*a* and 7*b*.

Rod Formation

The aerosol generating strips 16 formed by cutting the continuous web 34 of aerosol generating substrate 10 are conveyed to the rod forming unit 56 where they are formed into a continuous rod 88. The continuous strip 218 of aerosol generating substrate 10 with the adhered susceptor patches 28 is also conveyed to the rod forming unit 56 by the feed rollers 51 and is combined with the aerosol generating strips 16 to form the continuous rod 88. If desired, a continuous sheet of wrapping paper (not shown) can be supplied to the rod forming unit 56 from a supply reel (not shown) or can be supplied to a separate wrapping unit (again from a supply reel) which can be positioned downstream of the rod forming unit 56. As the sheet of wrapping paper is transported and guided through the rod forming unit 56 or the separate wrapping unit, it can be wrapped around the aerosol generating strips 16 and the susceptor patches 28 so that the continuous rod 88 is circumscribed by a wrapper 14.

Rod Cutting

The continuous rod 88 (optionally circumscribed by a wrapper 14) is then transported to the rod cutting unit 58 where it is cut at appropriate positions into predetermined lengths to form multiple aerosol generating articles 2. The aerosol generating articles 2 formed by the rod cutting unit 58 may have a length between 5 mm and 50 mm, preferably between 10 mm and 30 mm. It will be understood that this length corresponds to the length of the aerosol generating substrate 10 described above with reference to FIGS. 7*a* and 7*b*. The continuous rod 88 is preferably cut repeatedly by the rod cutting unit 58 substantially at a midpoint between the edges of the susceptor patches 28. In this way, the susceptor patches 28 are not cut by the rod cutting unit 58, thereby reducing wear on the cutting elements. Further, because the susceptor patches are shorter than the aerosol generating strips 16, the ends of the individual susceptor patches 28 (i.e., the elongate second strips 13) are not visible at either end of the aerosol generating articles 2 formed by the rod cutting unit 58. It will be understood that this type of method is particularly suitable for the mass production of aerosol generating articles 2.

Final Assembly

Further units (not shown) may be arranged downstream of the rod cutting unit 58 and may be configured to provide one or more additional components such as the mouthpiece segment 20 described above and to assemble these with the individual aerosol generating articles 2 formed by the rod cutting unit 56 to form finished aerosol generating articles 2, for example of the type illustrated in FIG. 7. In this case, a separate wrapping unit may be provided downstream of the rod cutting unit 58 so that the assembled components can be simultaneously wrapped to form the finished aerosol generating articles 2. The further units may form part of the apparatus 230 or may be separate, stand-alone, units forming part of a final assembly line.

Although exemplary embodiments have been described in the preceding paragraphs, it should be understood that various modifications may be made to those embodiments without departing from the scope of the appended claims. Thus, the breadth and scope of the claims should not be limited to the above-described exemplary embodiments.

Any combination of the above-described features in all possible variations thereof is encompassed by the present disclosure unless otherwise indicated herein or otherwise clearly contradicted by context.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

The invention claimed is:

1. A method for continuously manufacturing aerosol generating articles, the method comprising:

(i) providing a continuous web or a continuous strip of an aerosol generating substrate;

(ii) providing a continuous web of susceptor material;

(iii) continuously cutting the continuous web of susceptor material to form a plurality of susceptor patches;

(iv) consecutively applying the plurality of susceptor patches to a surface of the continuous web or the continuous strip of the aerosol generating substrate with a predefined and constant spacing between each successive susceptor patch; and (v) forming the continuous web or the continuous strip of the aerosol generating substrate and the plurality of susceptor patches into a continuous rod;

wherein step (iii) is performed using a rotary cutting unit comprising a support drum supporting the continuous web of susceptor material around a periphery thereof and a cutting drum having a plurality of circumferentially spaced cutting elements around a periphery thereof, wherein the plurality of cutting elements cooperate with the support drum to shear cut the continuous web of susceptor material to form the plurality of susceptor patches, and permitting relative movement between the continuous web of susceptor material and the support drum for a predetermined period of time immediately after cutting the continuous web of susceptor material so that the continuous web of susceptor material remains stationary or travels at a reduced speed for the predetermined period of time.

2. The method according to claim 1, wherein step (iii) comprises uniformly cutting the continuous web of susceptor material at a predefined and constant spacing so that each of the plurality of susceptor patches has substantially the same length in a direction of travel of the continuous web of susceptor material.

3. The method according to claim 1, wherein the support drum includes a plurality of circumferentially spaced recesses around its periphery and the plurality of cutting elements on the cutting drum cooperate with the circumferentially spaced recesses during rotation of both the support drum and the cutting drum to shear cut the continuous web of susceptor material to form the plurality of susceptor patches.

4. The method according to claim 1, wherein the support drum is a suction drum and the continuous web of susceptor material and one or more of the plurality of susceptor patches are supported around the periphery of the suction drum by a suction force.

5. The method according to claim 4, wherein a predefined and constant spacing between each successive susceptor patch is obtained by permitting the relative movement between the continuous web of susceptor material and the support drum for the predetermined period of time immediately after cutting the continuous web of susceptor material to form a susceptor patch.

6. The method according to claim 5, wherein the relative movement between the continuous web of susceptor material and the support drum is obtained by reducing the suction force applied to the continuous web of susceptor material.

7. The method according to claim 1, wherein each of the plurality of susceptor patches has substantially the same dimensions.

8. The method according to claim 1, wherein a length of each of the plurality of susceptor patches is between 5 mm and 50 mm.

9. The method according to claim 1, wherein the predefined and constant spacing between each successive susceptor patch is between 1 mm and 20 mm.

10. The method according to claim 1, wherein step (iv) comprises adhering the plurality of susceptor patches to the surface of the continuous web or the continuous strip of the aerosol generating substrate.

11. The method according to claim 1, wherein step (iv) comprises pressing the plurality of susceptor patches onto the surface of the continuous web or the continuous strip of the aerosol generating substrate.

12. The method according to claim 1, wherein the surface of the continuous web or the continuous strip of the aerosol generating substrate provided in step (i) is a substantially flat surface with a centre line, and step (iv) comprises consecutively applying the plurality of susceptor patches to the substantially flat surface substantially along the centre line.

13. The method according to claim 1, wherein the method further comprises:

(vi) cutting the continuous rod to form a plurality of individual aerosol generating articles each comprising at least one of the plurality of susceptor patches.

14. The method according to claim 13, wherein step (vi) comprises cutting the continuous rod at a position between adjacent ones of the plurality of susceptor patches.

15. The method according to claim 14, wherein step (vi) comprises cutting the continuous rod substantially at a midpoint between adjacent ones of the plurality of susceptor patches.

16. The method according to claim 1, wherein a length of each of the plurality of susceptor patches is between 10 mm and 30 mm.

17. The method according to claim 1, wherein the predefined and constant spacing between each successive susceptor patch is between 2 mm and 10 mm.

18. The method according to claim 1, wherein step (iv) comprises pressing the plurality of susceptor patches onto the surface of the continuous web or the continuous strip of the aerosol generating substrate using a cam roller.

* * * * *